(12) United States Patent
Nanjo et al.

(10) Patent No.: US 7,463,427 B2
(45) Date of Patent: Dec. 9, 2008

(54) ZOOM LENS AND IMAGE PICKUP APPARATUS

(75) Inventors: Yusuke Nanjo, Kanagawa (JP); Shinichi Arita, Tokyo (JP)

(73) Assignee: Sony Corporation, Tokyo (JP)

( * ) Notice: Subject to any disclaimer, the term of this patent is extended or adjusted under 35 U.S.C. 154(b) by 639 days.

(21) Appl. No.: 10/542,087

(22) PCT Filed: Dec. 12, 2003

(86) PCT No.: PCT/JP03/15942

§ 371 (c)(1), (2), (4) Date: Jul. 13, 2005

(87) PCT Pub. No.: WO2004/066011

PCT Pub. Date: Aug. 5, 2004

(65) Prior Publication Data

US 2006/0055815 A1    Mar. 16, 2006

(30) Foreign Application Priority Data

Jan. 17, 2003  (JP)  ................................. 2003-9719
Jun. 5, 2003   (JP)  ............................. 2003-160877

(51) Int. Cl.
  *G02B 15/14*  (2006.01)
  *G02B 3/02*   (2006.01)
  *G02B 9/34*   (2006.01)

(52) U.S. Cl. .................. 359/687; 359/683; 359/684; 359/685; 359/715; 359/740

(58) Field of Classification Search ......... 359/683–685, 359/687, 715, 740, 774

See application file for complete search history.

(56) References Cited

U.S. PATENT DOCUMENTS 4,756,608 A    7/1988  Itoh
(Continued)

FOREIGN PATENT DOCUMENTS

EP    0 533 077 A1   3/1993
(Continued)

*Primary Examiner*—William C. Choi
*Assistant Examiner*—Jack Dinh
(74) *Attorney, Agent, or Firm*—Oblon, Spivak, McClelland, Maier & Neustadt, P.C.

(57) ABSTRACT

A zoom lens made up of a first lens group having positive refracting power, a second lens group having negative refracting power, a third lens group having positive refracting power, and a fourth lens group having positive refracting power, which are disposed in order from an object side, in which the first lens group and the third lens groups are stationary, and the zoom lens performs mainly variable power by shifting the second lens group in an optical axis direction, and performs correction for image position fluctuations and focusing by shifting the fourth lens group in the optical axis direction, is characterized in that the first lens group is composed of five lenses: a concave lens; a convex lens with a strong convexity facing to an image side; a cemented lens made up of a concave lens with a strong concavity facing to the image side, and a convex lens; and a convex lens with a strong convexity facing to the object side, which are disposed in order from the object side, and by satisfying each of the following conditional expressions:

(1) $1.25 < h_{1\text{-}4}/h_{1\text{-}1} < 1.55$;

(2) $d_{1\text{-}2}/d_{1\text{-}3} < 0.4$;

(3) $1.65 < n_{1\text{-}2}$;

and (4) $0.1 < H_1'/f_1 < 0.6$.

20 Claims, 17 Drawing Sheets

U.S. PATENT DOCUMENTS 6,751,028 B1 * 6/2004 Horiuchi ................ 359/687

FOREIGN PATENT DOCUMENTS

| EP | 0 752 605 | 1/1997 |
| EP | 0 773 460 | 5/1997 |
| JP | 62-073222 | 4/1987 |
| JP | 2-287414 | 11/1990 |
| JP | 02-287414 | 11/1990 |
| JP | 05-072475 | 3/1993 |
| JP | 06-138389 | 5/1994 |
| JP | 6-181530 | 6/1994 |
| JP | 08-201694 | 8/1996 |
| JP | 8-201694 | 9/1996 |
| JP | 09-005628 | 1/1997 |
| JP | 9-243909 | 9/1997 |
| JP | 09-243909 | 9/1997 |

\* cited by examiner

ZOOM LENS AND IMAGE PICKUP APPARATUS

TECHNICAL FIELD

The present invention relates to a novel zoom lens and, in particular, to a zoom lens suitable for a video camera or a digital still camera, and an image pickup apparatus using the same. Specifically, it relates to a technique of providing a small zoom lens that, in obtaining a wide angle zoom lens, a lens of extremely simple construction is additionally supplemented to an object side of a zoom lens based on a conventional technique so as to strike a balance of aberration correction as a total system, thereby suitably correcting various aberrations other than distortion, and that has an extremely small front lens diameter, and also providing an image pickup apparatus in which distortion due to the above zoom lens is corrected to obtain an excellent image by processing a video signal obtained from an image pickup element.

BACKGROUND ART

In zoom lenses mainly used in consumer video cameras, a so-called four group inner focus zoom system is the main stream, which has a four group configuration in which refracting power arrangement is positive, negative, positive, and positive in order from an object side, wherein a first lens group and a third lens group are stationary, and variable power is mainly performed by shifting a second lens group in an optical axis direction, and correction for image position fluctuations and focusing are performed by shifting a fourth lens group in the optical axis direction. As the configuration of the zoom lens related to this system, there have been proposed many different types, such as those described in Japanese Patent Application Laid-Open Nos. Hei 3-33710 and Hei 4-153615.

In these lens configurations, the lens configurations of the first lens group and the second lens group employ a very similar lens type, so that the angle of view of a picked-up image diagonal at a wide angle end is about 60 degrees at the utmost. For example, one described in Japanese Patent Application Laid-Open No. 2000-28922 attempts to achieve miniaturization of a front lens diameter by bringing an image side principal point of the first lens group closer to the surface closest to an image side of the first lens group, but fails to achieve widening of the angle of view at a wide angle end to not less than 60 degrees, thus failing to accomplish compatibility between widening of angle and miniaturization of the front lens diameter.

As an example of attempt to achieve sufficient widening of angle, there is known one described in Japanese Patent Application Laid-Open No. Hei 5-72475, which has developed the first lens group from a three-lens configuration into a five-lens configuration, on the basis of Japanese Patent Application Laid-Open No. Hei 3-33710.

There has also been proposed to correct a distortion that varies depending on zooming (variable power) by an electric signal processing technique on an image pickup apparatus side. For example, Japanese Patent Application Laid-Open No. Hei 6-165024 is known.

In the zoom lens described in Japanese Patent Application Laid-Open No. Hei 5-72475, based on the lens type shown in Japanese Patent Application Laid-Open No. Hei 3-33710, the inclination of a principal ray to the third and later lenses of the first lens group is reduced to permit correction for various aberrations by disposing a concave lens and a convex lens having large air spacing therebetween on the object side of the first lens group of the three-lens configuration, in order to add a configuration close to an afocal system, such as a wide conversion lens.

It is however necessary to dispose the added two lenses with large air spacing, in order to correct properly in balance the distortion of a wide angle end that tends to increase due to widening of angle and meridional curvature of field, so an increase in front lens diameter is unavoidable. Moreover, since the zoom lens is the invention made only for the purpose of widening of angle of the lens configuration of Japanese Patent Application Laid-Open No. Hei 3-33710, it is realized by strictly regulating the lens configuration of the first lens group through the fourth lens group. With regard to specifications such as zoom ratio and F-number, front lens diameter, total length, back focus, etc., an optimum lens configuration for the intended purpose is not always obtainable.

The present invention has for its subject to provide a wide-angle zoom lens most suitable for various specifications, which enables such widening of angle that the angle of view at a wide angle end is not less than 60 degrees, by making a first lens group into a five-lens configuration different from Japanese Patent Application Laid-Open No. Hei 5-72475, in combination with many different variations of so-called four-group inner focus system zoom lens, and in which increase in front lens diameter is minimized to achieve the harmonization between widening of angle and miniaturization of front lens diameter, and many different types of variations of conventional types are applied to a third lens group and a fourth lens group.

Further miniaturization is also enabled in the following manners that distortion, the correction for which inevitably becomes difficult by achieving the harmonization between widening of angle and miniaturization of front lens diameter, is corrected by a video signal processing, and that the ratio of the angle of view of a wide angle end to that of a telephoto end, obtainable from an image surface after distortion correction, is redefined as a zoom ratio, thereby reducing paraxial focal length ratio (general definition of zoom ratio). The present invention has for its subject to provide an image pickup apparatus that permits miniaturization for a zoom ratio required, by actively and largely causing negative distortion at a wide angle end and positive distortion at a telephoto end, so that the change in the angle of view after distortion correction is sufficiently greater for the change in paraxial focal length.

DISCLOSURE OF THE INVENTION

To solve the above-mentioned subject, a zoom lens of the present invention is made up of a first lens group having positive refracting power, a second lens group having negative refracting power, a third lens group having positive refracting power, and a fourth lens group having positive refracting power, which are disposed in order from an object side, wherein the first lens group and the third lens group are stationary, and the zoom lens performs mainly variable power (zooming) by shifting the second lens group in an optical axis direction, and performs correction for image position fluctuations and focusing by shifting the fourth lens group in the optical axis direction, in which:

the first lens group is composed of five lenses: a concave lens; a convex lens with a strong convexity facing to an image side; a cemented lens made up of a concave lens with a strong concavity facing to the image side, and a convex lens; and a convex lens with a strong convexity facing to the object side, which are disposed in order from the object side, and configured so as to satisfy each of the following respective conditional expressions (1), (2), (3), and (4):

$$1.25 < h4\text{-}/h1\text{-}1 < 1.55 \quad (1)$$

$$d1\text{-}2/d1\text{-}3 < 0.4 \quad (2)$$

$$1.65 < n1\text{-}2 \quad (3)$$

$$0.1 < H1'/f1 < 0.6 \quad (4)$$

where:
- f1 is a focal length of the first lens group;
- h1-i is a paraxial ray height in the i-th surface from the object side, when allowing a paraxial ray parallel to an optical axis to enter the first lens group;
- d1-i is axial spacing from the i-th surface to the (i+1)-th surface in the first lens group;
- n1-i is a refractive index on a d-line of the i-th surface in the first lens group; and
- H1' is spacing from a vertex of a surface closest to the image side in the first lens group to an image side principal point in the first lens group ("−" indicates the object side, and "+" indicates the image side).

Therefore, in the zoom lens of the present invention, it is possible to correct various aberrations, and widening of angle and miniaturization of front lens diameter are both satisfied.

An image pickup apparatus of the present invention comprises: a zoom lens; image pickup means converting an image captured by the zoom lens into an electric image signal; and image control means. The image control means is configured so as to form a new image signal subjected to coordinate conversion by shifting a point on an image defined by an image signal formed by the image pickup means, while referring to a conversion coordinate factor previously provided in response to a variable power rate through the zoom lens, and then output the new image signal. The zoom lens is made up of a first lens group having positive refracting power, a second lens group having negative refracting power, a third lens group having positive refracting power, and a fourth lens group having positive refracting power, which are disposed in order from an object side. The first lens group and the third lens group are stationary, and the zoom lens performs mainly variable power by shifting the second lens group in an optical axis direction, and performs correction for image position fluctuations and focusing by shifting the fourth lens group in the optical axis direction. The first lens group is composed of five lenses: a concave lens; a convex lens with a strong convexity facing to an image side; a cemented lens made up of a concave lens with a strong concavity facing to the image side, and a convex lens; and a convex lens with a strong convexity facing to the object side, which are disposed in order from the object side, and configured so as to satisfy each of the following conditional expressions: (1) 1.25<h1-4/h1-1<1.55; (2) d1-2/d1-3<0.4; (3) 1.65<n1-2; and (4) 0.1<H1'/f1<0.6, where F1 is a focal length of the first lens group; h1-i is a paraxial ray height in the i-th surface from the object side when allowing a paraxial ray parallel to an optical axis to enter the first lens group; d1-i is axial spacing from the i-th surface to the (i+1)-th surface in the first lens group; n1-i is a refractive index on a d line of the i-th surface in the first lens group; and H1' is spacing from a vertex of a surface closest to the image side in the first lens group to an image side principal point in the first lens group ("−" indicates the object side, and "+" indicates the image side).

Therefore, in the image pickup apparatus of the present invention, miniaturization for a zoom ratio required is enabled by actively and largely causing negative distortion at a wide angle end and positive distortion at a telephoto end, so that the change in the angle of view after distortion correction is sufficiently greater for the change in paraxial focal length.

BEST MODE FOR CARRYING OUT THE INVENTION

Preferred embodiments of a zoom lens and an image pickup apparatus of the present invention will be described below with reference to the accompanying drawings. FIG. 1 to FIG. 4 show a first preferred embodiment. FIG. 5 to FIG. 8 show a second preferred embodiment. FIG. 9 to FIG. 12 show a third preferred embodiment. FIG. 13 to FIG. 16 show a fourth preferred embodiment.

Figure 1:
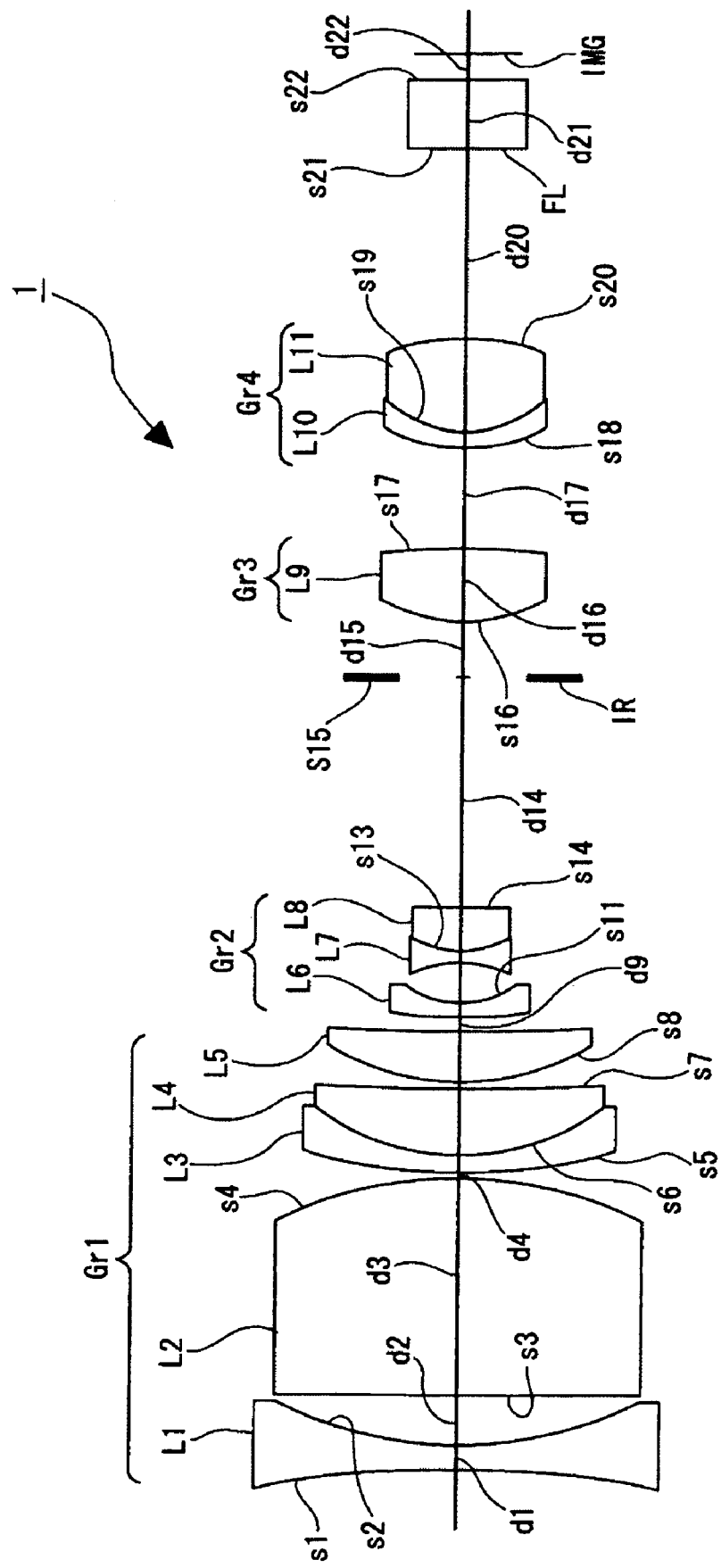
FIG. 1 is a schematic diagram showing a first preferred embodiment of a zoom lens of the present invention, together with FIG. 2 to FIG. 4, which particularly shows a lens configuration.
Figure 5:
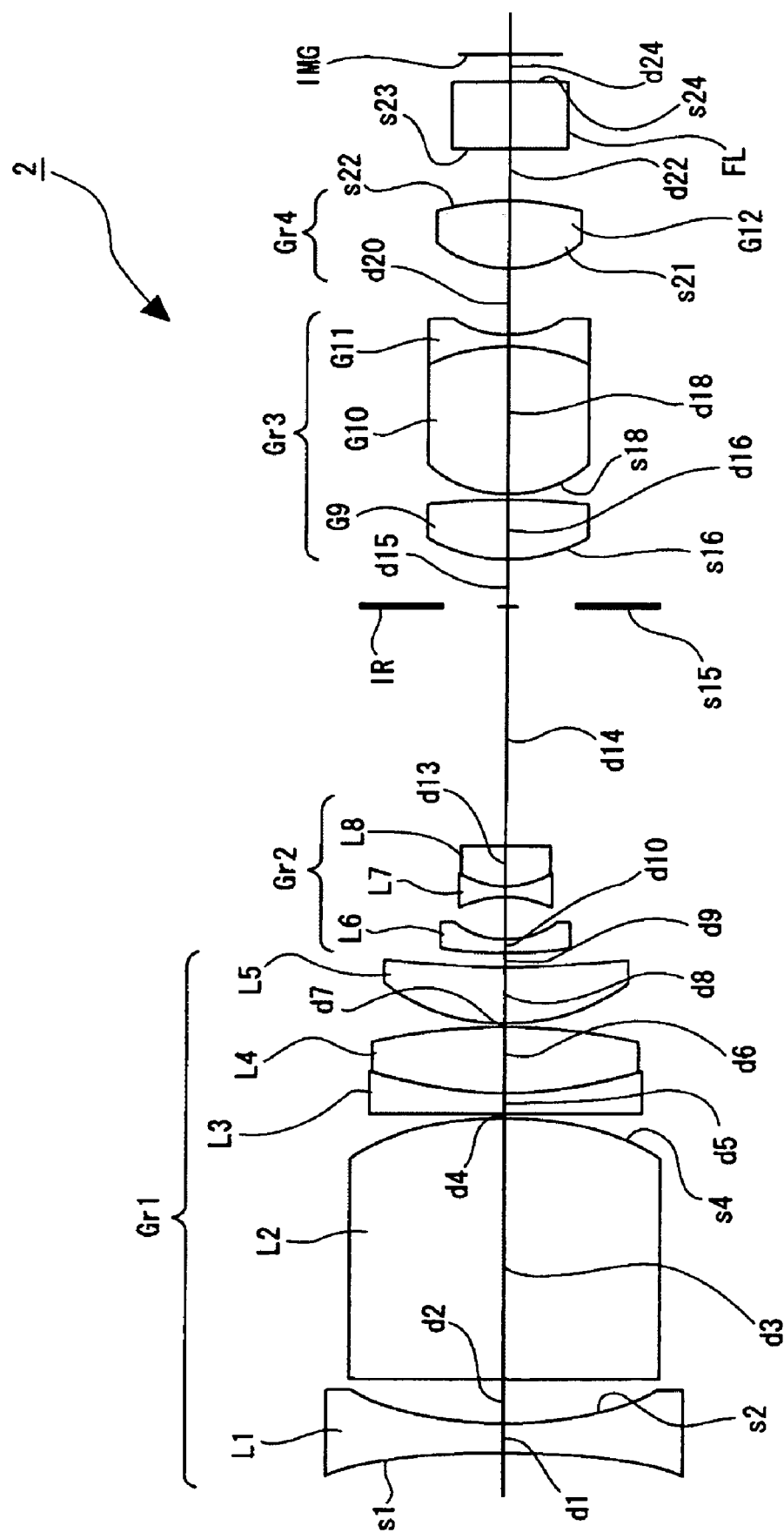
FIG. 5 is a schematic diagram showing a second preferred embodiment of a zoom lens of the present invention, together with FIG. 6 to FIG. 8, which particularly shows a lens configuration.

Zoom lenses 1, 2, 3, and 4 according to the first to the fourth preferred embodiments have, as shown in FIG. 1, FIG. 5, FIG.

Figure 13:
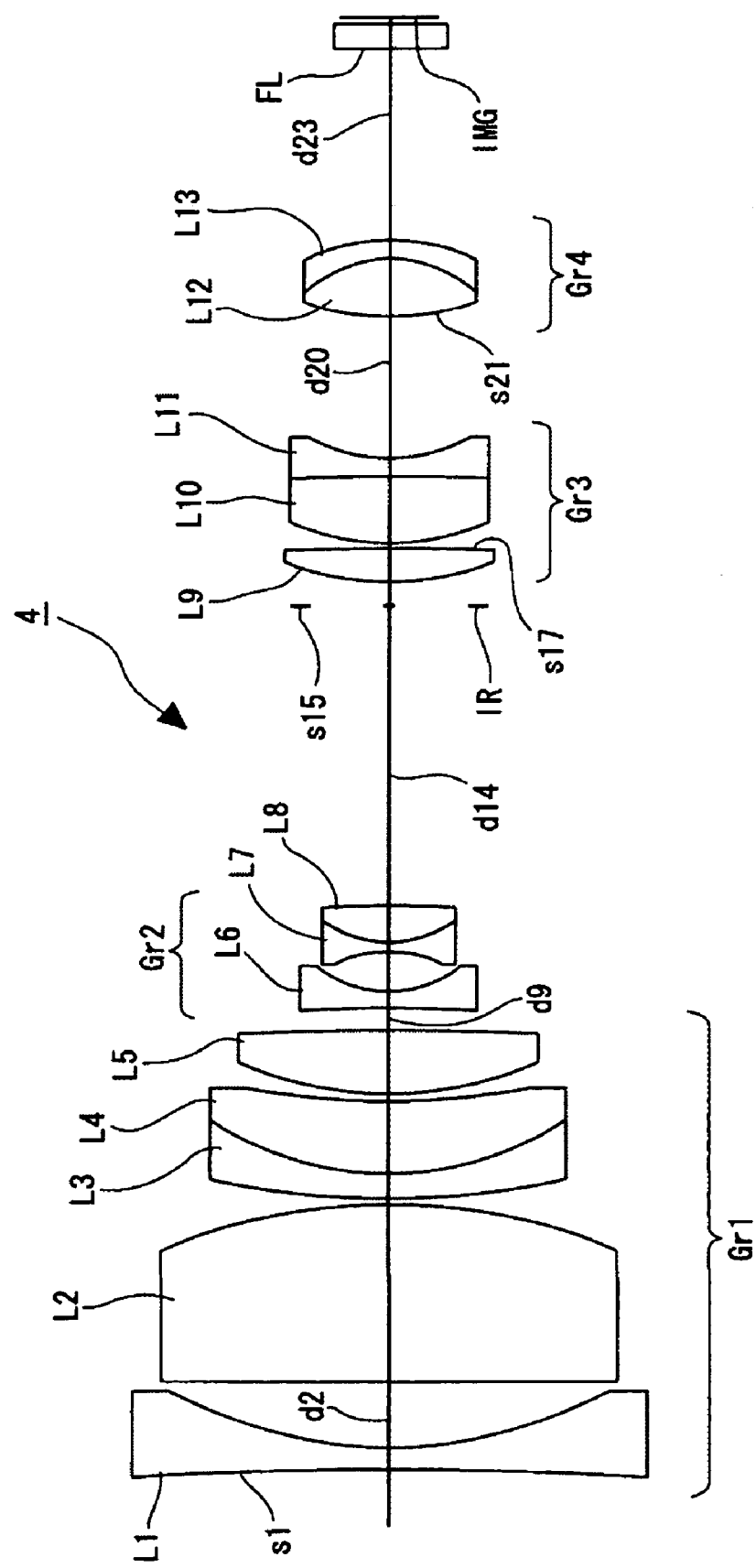
FIG. 13 is a schematic diagram showing a fourth preferred embodiment of a zoom lens of the present invention, together with FIG. 14 to FIG. 16, which particularly shows a lens configuration.

9, and FIG. 13, an optical system made up of: a first lens group Gr1 having positive refracting power; a second lens group Gr2 that has negative refracting power and is removable in an optical axis direction in order to mainly perform zooming (variable power); a third lens group Gr3 having positive refracting power; and a fourth lens group Gr4 that has positive refracting power and is removable in an optical axis direction in order to correct focal position fluctuations during zooming and also perform focusing, which are disposed in order from an object side.

The above respective zoom lenses 1, 2, 3, and 4 are different in the requirements of the configurations of the third lens group Gr3 and the fourth group lens Gr4. The requirements of the first lens group Gr1 and the second lens group Gr2 are common to them.

In the zoom lenses 1, 2, 3, and 4, the first lens group Gr1 is made up of five lenses: a concave lens L1; a convex lens L2 with a strong convexity facing to an image side; a cemented lens made up of a concave lens L3 with a strong concavity facing to the image side, and a convex lens L4; and a convex lens L5 with a strong convexity facing to the object side, which are disposed in order from an object side, and satisfies each of the following conditional expressions (1), (2), (3), and (4):

(1) $1.25 < h1\text{-}4/h1\text{-}1 < 1.55$;

(2) $d1\text{-}2/d1\text{-}3 < 0.4$;

(3) $1.65 < n1\text{-}2$;

and (4) $0.1 < H1'/f1 < 0.6$, where:
 f1 is a focal length of the first lens group;
 h1-i is a paraxial ray height in the i-th surface from the object side when allowing a paraxial ray parallel to an optical axis to enter the first lens group;
 d1-i is axial spacing from the i-th surface to the (i+1)-th surface in the first lens group;
 n1-i is a refractive index on a d-line of the i-th lens in the first lens group; and
 H1' is spacing from a vertex of a surface closest to the image side in the first lens group to an image side principal point in the first lens group ("−" indicates the object side, and "+" indicates the image side).

The conditional expression (1) is to express the condition for enabling sufficient aberration correction even if a configuration close to a conventional case is applied to the lens configuration of the concave lens L3 and the later lenses by taking a configuration close to afocal by the use of the concave lens L1 and the convex lens L2, thereby reducing the inclination of a principal ray that enters the concave lens L3. Exceeding a lower limit may make it difficult to sufficiently reduce the inclination of the principal ray that enters the concave lens L3. Exceeding an upper limit may increase the synthetic thickness from the concave lens L1 to the convex lens L2, and causes enlargement of front lens dimension, thereby making it difficult to achieve miniaturization of front lens diameter, which is an object of the present invention.

The conditional expression (2) is to express the condition for miniaturizing front lens diameter than a conventional case, while satisfying the conditional expression (1). When the inclination of a principle ray in the air spacing between the concave lens L1 and the convex lens L2 is compared with the inclination of a principle ray in the convex lens L2, the inclination of the principle ray at the time of passing within the convex lens L2 is smaller. Therefore, in order to obtain the same result by the conditional expression (1), it is advantageous for miniaturization of front lens diameter, to narrow the above mentioned air spacing and thicken the convex lens L2. Accordingly, it is prerequisite for achieving the object of the present invention to increase the thickness of the convex lens L2 rather than the above air spacing. The lower limit of this conditional expression is an effective diameter that is determined from an off-axis luminous flux passing through the most periphery of the concave lens L1, and is a value enabling to configure so that the concave lens L1 and the convex lens L2 come into contact with each other.

The conditional expression (3) is to express the condition for miniaturizing front lens diameter by further reducing the inclination of the principal ray within the convex lens L2. Exceeding a lower limit may increase the thickness of the convex lens L2 for satisfying the conditional expression (1). As a result, the front lens diameter may be enlarged.

The conditional expression (4) is to express the condition for providing the first lens group Gr1 with a configuration suitable for achieving the harmonization between widening of angle and miniaturization of front lens diameter, through the use of an approximately afocal configuration by the use of the concave lens L1 and the convex lens L2. A sufficient high variable power ratio can be obtained while satisfying both widening of angle and miniaturization of front lens diameter, by defining the refracting power arrangement of the respective lenses such that the image side principal point of the first lens group Gr1 is generated on the sufficiently image side than the most image side surface of the first lens group Gr1.

In the zoom lenses 1, 2, 3, and 4, the second lens group Gr2 is composed of three lenses of a concave meniscus lens L6 with a strong concavity facing to the image side, a double concave lens L7, and a convex lens L8, which are disposed in order from the object side, and satisfy the conditional expression (5):

$1.8 < (n2\text{-}1 + n2\text{-}2)/2$, (5)

where:
 n2-1 is a refractive index on a d-line of the concave meniscus lens of the second lens group; and
 n2-2 is a refractive index on a d-line of the double concave lens of the second lens group.

The conditional expression (5) is to prevent that Petzval sum necessary to the correction for curvature of field becomes too small. The configuration of the first lens group Gr1 is like so-called retro focus type, in which the image side principal point protrudes to the image side, so that the Petzval sum inherent in the first lens group Gr1 is plus and a small value. That contributes to letting Petzval sum of the overall system be too small, but there is inevitability and that is unavoidable. To bring the Petzval sum of the overall system into an appropriate value, means that weakens the refracting power of the second lens group Gr2, or means that increases the refracting power of the concave lens of the second lens group Gr2 can be considered. However, if the refracting power of the second lens group Gr2 is weakened, the amount of movement of the second lens group Gr2 required for variable power is increased to cause enlargement. It is therefore necessary to bring an average value of the refracting powers of the concave meniscus lens L6 and the double concave lens L7 of the second lens group Gr2, into one within the range of the conditional expression (5), so as to facilitate the correction for curvature of field.

The zoom lenses 1, 2, 3, and 4 are different from one another in the condition related to the configurations of the third lens group Gr3 and the fourth group lens Gr4.

With regard to the configurations of the third lens group and the fourth lens group, the zoom lens 1 according to the first preferred embodiment has the following configuration.

As can be seen from FIG. 1, the third lens group Gr3 is made up of a single convex lens L9, and at least one surface is composed of an aspheric surface. The fourth lens group Gr4 is composed of a cemented lens made up of a concave meniscus lens L10 with a concavity facing to an image side, and a double convex lens L11 whose surface on the image side is an aspheric surface,-which are disposed in order from an object side. These satisfy the following respective conditional expressions (6), (7), and (8):

$$-0.4 < f3/r3\text{-}2 < 0.4; \qquad (6)$$

$$-1.25 < r4\text{-}1/r4\text{-}3 < -0.8; \qquad (7)$$

and $$0.3 < -2/f4 < 0.6, \qquad (8)$$

where:
f3 is a focal length of the third lens group;
f4 is a focal length of the fourth lens group;
r3-2 is a radius of curvature of the image side surface of the convex lens in the third lens group;
r4-1 is a radius of curvature of the object side surface of the concave meniscus lens in the fourth lens group;
r4-2 is a radius of curvature of a cemented surface in the fourth lens group; and
r4-3 is a radius of curvature of a surface on the image side of the convex lens in the fourth lens group.

The conditional expression (6) is to define the shape of the an aspheric surface single convex lens L9 of the third lens group Gr3, and define the condition related to the sensitivity with regard to the decentering (misalignment) at the time of forming an aspheric surface, and the relative decentering between the third lens group Gr3 and the fourth lens group Gr4. The decentering degree of both surfaces of an aspheric surface lens is determined depending on the decentering degree of a mold. For example, a glass mold can cause decentering of about 10 μm. Moreover, when assembled in a lens-barrel, the relative decentering between the third lens group Gr3 and the fourth lens group Gr4 can arise in an amount of about 20 μm. In order that the image quality of products can sufficiently reproduce design performance even in the presence of such an error, it is required to design so as to relax such sensitivity that the decentering between the respective surfaces exerts on the image quality. Exceeding an upper limit may increase such sensitivity that the decentering between the respective surfaces exerts on the image quality, and the precision required for forming and assembling may exceed process capability, thus making it difficult to mass-produce with stable performance. Exceeding a lower limit may make it difficult to correct properly in balance spherical aberration and curvature of field.

The conditional expression (7) relates to the decentering sensitivity of the fourth lens group Gr4. Exceeding a lower limit may result in that the positive refracting power of the fourth lens group Gr4 concentrates on a surface on the object side of the concave meniscus lens L10 (its radius of curvature is r4-1), and aberration deterioration due to the decentering and inclination of this surface becomes significant, thus making it difficult to stably reproduce design performance in mass production. Even if the fourth lens group Gr4 has an error in decentering and inclination, the sensitivity that deteriorates aberration can also be dispersed by properly dispersing the positive refracting power of the fourth lens group Gr4 into a surface on the object side of the concave meniscus lens L10 and a surface on the image side of the double convex lens L11 (its radius of curvature is r4-3). However, exceeding an upper limit may increase spherical aberration generated from a surface on the image side of the double convex lens L11, and may render correction difficult.

The above conditional expression (8) relates to the correction for coma aberration and curvature of field. In the state that the radius of curvature r4-2 of the cemented surface between the concave meniscus lens L10 having negative refracting power and the double convex lens L11 satisfies the conditional expression (7), if tried to determine a glass material of the concave meniscus lens L10 and the double convex lens L11, so great degree of freedom of design cannot be obtained from the condition for chromatic aberration correction. However, since the above-mentioned cemented surface shape performs dominant operation related to the correction for coma aberration and curvature of field, it is required to select a glass material so as to satisfy the conditional expressions (7) and (8). Exceeding an upper limit may result in that, even when a great difference of refractive index between the concave meniscus lens L10 and the double convex lens L11 is configured, the negative refracting power of the cemented surface of both lenses (the concave meniscus lens L10 and the double convex lens L11) becomes too small, thus making it difficult to correct an inward coma aberration and curvature of field inclined to an under side. Exceeding a lower limit may result in that the coma aberration of a color, in which a g-line is jumped outwardly on an upper ray side of an off-axis luminous flux, becomes significant and correction becomes difficult.

With regard to the configurations of the third lens group and the fourth lens group, the zoom lens 2 according to the second preferred embodiment has the following configuration.

As can be seen from FIG. 5, in the zoom lens 2, a third lens group Gr3 is composed of a convex lens G9, and a cemented lens made up of a convex lens G10 with a strong convexity facing to an object side, and a concave lens G11 with a strong concavity facing to an image side, which are disposed in order from the object side, and at least one surface is an aspheric surface. A fourth lens group Gr4 is made up of a single convex lens G12, and at least one surface is an aspheric surface. These satisfy each of the following conditional expressions (9) and (10):

$$0.4 < h3\text{-}5/h3\text{-}1 < 0.7; \qquad (9)$$

and $$0.75 < f3/f3\text{-}1 < 1, \qquad (10)$$

where:
h3-i is a paraxial ray height in the i-th surface from the object side of the third lens group Gr3, when allowing a paraxial ray parallel to an optical axis to enter the first lens group Gr1 at a wide angle end;
f3 is a focal length of the third lens group Gr3; and
f3-1 is a focal length of the single convex lens of the third lens group Gr3.

The conditional expression (9) is to express the condition for shortening the total length by shortening the focal length of the fourth lens group Gr4. Exceeding an upper limit may result in failure to obtain sufficient effect of shortening the total length. Exceeding a lower limit may result in that Petzval sum becomes too small and the correction for curvature of field becomes difficult.

The above conditional expression (10) relates to the decentering sensitivity of the convex lens G9 that is the first lens of the third lens group Gr3. In determining the refracting power arrangement of the respective surfaces of the third lens group Gr3 so as to satisfy the conditional expression (9), if too much burden of positive refracting power is concentrated on the convex lens G9, when an error of decentering or inclination occurs in the convex lens G9, aberration deterioration becomes significant, and stable performance maintenance in mass production becomes difficult. It is therefore important to have the convex lens G10, which is the second lens of the third lens group Gr3, share positive refracting power so as not to exceed the upper limit. Exceeding the lower limit may cause the need to increase the composite thickness of the convex lens G10 and the concave lens G11, which constitute the cemented lens of the third lens group Gr3, in order to satisfy the conditional expression (9). Thus, even when back focus can be shortened, the total length shortening cannot be attained, thereby failing to achieve miniaturization that is an object of the present invention.

With regard to the configurations of the third lens group Gr3 and the fourth lens group Gr4, the zoom lens 3 according to the third preferred embodiment has the following configuration.

Figure 9:
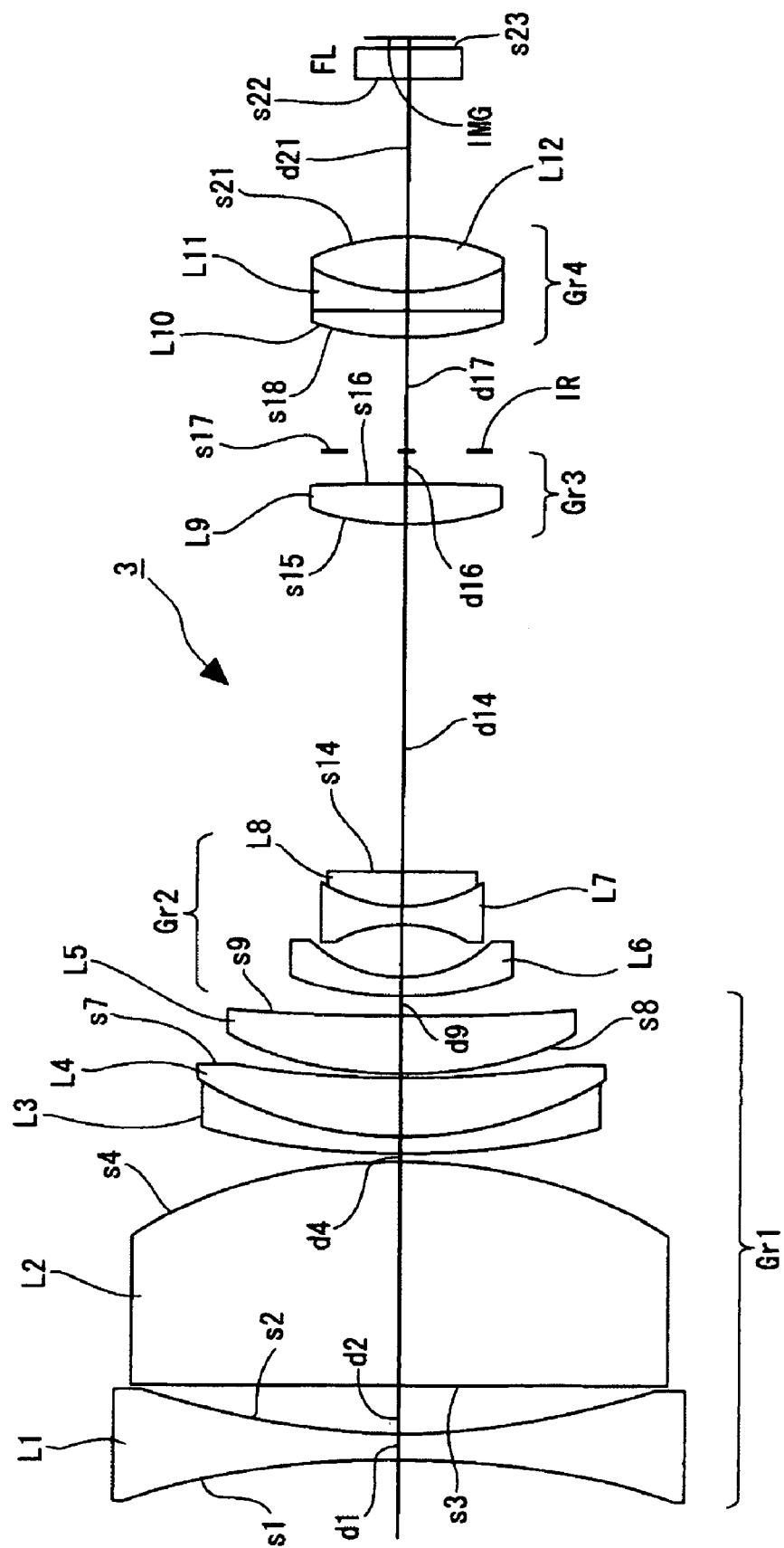
FIG. 9 is a schematic diagram showing a third preferred embodiment of a zoom lens of the present invention, together with FIG. 10 to FIG. 12, which particularly shows a lens configuration.

As can be seen from FIG. 9, a third lens group Gr3 is made up of a single convex lens L9, and at least one surface is composed of an aspheric surface. A fourth lens group Gr4 is composed of a cemented lens made up of a convex lens L10 with a convexity facing to an object side, a concave lens L11, and a convex lens L12, which are disposed in order from the object side. Further, at least a surface closest to the object side is an aspheric surface. These satisfy each of the following conditional expressions (11) and (12):

$$n4\text{-}2>1.8; \tag{11}$$

and $$0.1 < f3/f4 < 0.7, \tag{12}$$

where:
n4-2 is a refractive index on a d-line of the concave lens of the fourth lens group;
f3 is a focal length of the third lens group; and
f4 is a focal length of the fourth lens group.

The conditional expression (11) is to define a glass material of the concave lens L11 of the fourth lens group Gr4. By increasing the refractive index, the curvature of the cemented surface between the concave lens L10 and the convex lens L12 is relaxed, so that there are the function of suppressing refraction fluctuations due to colors relating to chromatic aberration and spherical aberration, which are due to movement of the fourth lens group Gr4, and the function of correcting Petzval sum toward the plus side, which is advantageous in correcting curvature of field.

The conditional expression (12) relates to the focal lengths of the third lens group Gr3 and the fourth lens group Gr4. Exceeding a lower limit may make it difficult to suppress spherical aberration fluctuations, or cause the amount of movement of the fourth lens group Gr4 to increase, or the total length increases. Exceeding an upper limit may increase aberration deterioration due to manufacturing error of the fourth lens group Gr4, which is unfavorable.

With regard to the configurations of the third lens group and the fourth lens group, the zoom lens 4 according to the fourth preferred embodiment has the following configuration.

As can be seen from FIG. 13, in the zoom lens 4, a third lens group Gr3 is composed of a convex lens G9, and a cemented lens made up of a convex lens G10 with a strong convexity facing to an object side, and a concave lens G11 with a strong concavity facing to an image side, which are disposed in order from the object side, and at least one surface is an aspheric surface. A fourth lens group Gr4 is composed of a cemented lens made up of a double convex lens L12, and a concave lens L13 with a convexity facing to the image side, and at least one surface is an aspheric surface. These satisfy each of the following conditional expressions (9), (11), and (13):

$$0.4 < h3\text{-}5/h3\text{-}1 < 0.7; \tag{9}$$

$$n4\text{-}2>1.8; \tag{11}$$

and $$0.75 < f3/f3\text{-}1 < 1.3, \tag{13}$$

where:
h3-i is a paraxial ray height in the i-th surface from the object side of the third lens group Gr3, when allowing a paraxial ray parallel to an optical axis to enter the first lens group Gr1 at a wide angle end;
f3 is a focal length of the third lens group Gr3;
f3-1 is a focal length of the single convex lens of the third lens group Gr3; and
n4-2 is a refractive index on a d-line of the concave lens of the fourth lens group.

The conditional expression (9) is to express the condition for shortening the total length by shortening the focal length of the fourth lens group Gr4. Exceeding an upper limit may result in failure to obtain sufficient effect of shortening the total length. Exceeding a lower limit may result in that Petzval sum becomes too small and the correction for curvature of field becomes difficult.

The conditional expression (11) is to define a glass material of the concave lens L13 of the fourth lens group Gr4. By increasing the refractive index, the curvature of the cemented surface with the double convex lens L12 is relaxed, so that there are the function of suppressing refraction fluctuations on chromatic aberration and spherical aberration due to the colors, which are due to movement of the fourth lens group Gr4, and the function of correcting Petzval sum toward the plus side, which is advantageous in correcting curvature of field.

The conditional expression (13) relates to the decentering sensitivity of the convex lens L9 that is the first lens of the third lens group Gr3. In determining the refracting power arrangement of the respective surfaces of the third lens group Gr3 so as to satisfy the conditional expression (9), if too much burden of positive refracting power is concentrated on the convex lens L9, when an error of decentering or inclination occurs in the convex lens L9, aberration deterioration becomes significant, and stable performance maintenance in mass production becomes difficult. It is therefore important to have the convex lens L10, which is the second lens of the third lens group Gr3, share the positive refracting power so as not to exceed the upper limit. Exceeding the lower limit may cause the need to increase the composite thickness of the convex lens L10 and the concave lens L11, which constitute the cemented lens of the third lens group Gr3, in order to satisfy the conditional expression (9). Even when back focus can be shortened, shortening of the total length cannot be attained, thereby failing to achieve miniaturization that is an object of the present invention.

Figure 17:
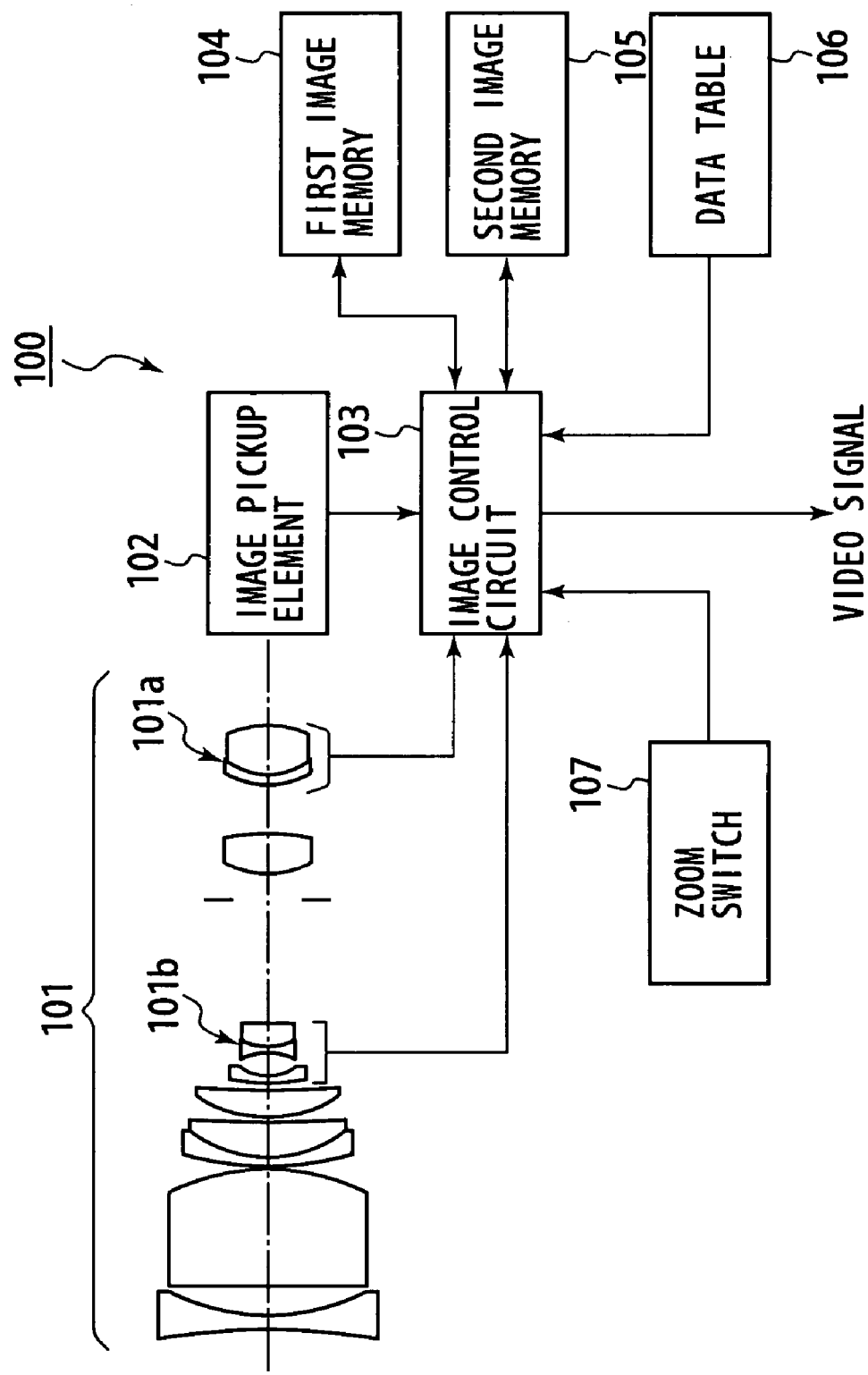
FIG. 17 is a block diagram showing the configuration of a preferred embodiment of an image pickup apparatus of the present invention.

FIG. 17 is a block diagram showing an example of the configuration of an image pickup apparatus 100 according to the present invention. In FIG. 17, the numeral 101 indicates an image pickup lens capable of zooming, which is provided with a focus lens 101a and a variator lens 101b; 102 indicates an image pickup element such as a CCD; 103 indicates an image control circuit for performing control of various operations, such as correcting distortion of an image; 104 indicates a first image memory for storing image data obtainable from the image pickup element 102; and 105 indicates a second image memory for storing image data in which distortion has been corrected. The numeral 106 indicates a data table for storing distortion information; and 107 indicates a zoom switch for converting an operator's zooming instruction into an electric signal.

For example, if the zoom lens 1, 2, 3, or 4 according to the above respective preferred embodiments is applied to the above image pickup lens 101, the focus lens 101a corresponds to the fourth lens group Gr4, and the variator lens 101b corresponds to the second lens group Gr2.

As shown in FIG. 2 through FIG. 4, FIG. 6 through FIG. 8, FIG. 10 through FIG. 12, and FIG. 14 through FIG. 16, which are related to the distortion of the image pickup lens 101, a distortion curve varies depending on zooming. Consequently, the distortion fluctuations depend on the position of the variator lens 101b. Hence, the data table 106 stores conversion coordinate factors, which associate the two-dimensional position information of the first image memory 104 and the second image memory 105 at certain positions of the variator lens 101b. Moreover, the position of the variator lens 101b is divided into many positions from a wide angle end to a telephoto end, and conversion coordinate factors corresponding to their respective positions are stored in the data table 106.

If an operator operates the zoom switch 107 to shift the position of the variator lens 101b, the image control circuit 103 shifts the focus lens 101a to control such that focus is not blurred, and also receives the conversion coordinate factor corresponding to the position of the variator lens 101b, from the data table 106. When the position of the variator lens 101b does not correspond to any of previously divided positions, a proper conversion coordinate factor is obtained from the conversion coordinate factor for a position in the vicinity thereof with the aid of processing, such as interpolation. The conversion coordinate factors are factors for shifting the positions of points on an image arranged discretely in two dimensions. With respect to an image between the points arranged discretely, a shift-destination position is found from processing, such as interpolation. The image control circuit 103 corrects distortion by performing vertical and horizontal image shift processing based on this conversion coordinate factor, to the information of the first image memory 104 obtained from the image pickup element 102, and creates, in the second image memory 105, image information in which the distortion has been corrected, and then outputs, as a video signal, a signal based on the image information created in the second image memory 105.

Numerical value embodiments in the zoom lenses 1, 2, 3, and 4 according to the above respective preferred embodiments will next be described.

In the above zoom lenses 1, 2, and 4, a fixed diaphragm IR is positioned immediately ahead of the third lens group Gr3, and a filter FL is interposed between the fourth lens group Gr4 and an image surface IMG. In the zoom lens 3, a fixed diaphragm IR is positioned immediately behind the third lens group Gr3, and a filter FL is interposed between the fourth lens group Gr4 and an image surface IMG.

In the following explanation, "si" indicates the i-th surface counting from an object side; "ri" indicates the radius of curvature of the i-th surface "si" counting from the object side; "di" indicates axial spacing between the i-th surface "si" and the (i+1)-th surface "si+1", counting from the object side; "ni" indicates a refractive index on a d-line (587.6 nm in wavelength) of the material constituting the i-th lens "Li" or "Gi"; "vi" indicates an Abbe number on the d-line of the material constituting the i-th lens "Li" or "Gi"; "nFL" indicates a refractive index on a d-line of a material constituting a filter F; "vFL" indicates an Abbe number on the d-line of a material constituting the filter FL; "Fno" indicates an open F value (F-number); and "ω" indicates a half angle of view.

An aspherical shape is to be defined by the following equation (Equation 1):

$$xi = \frac{H^2}{ri\left[1 + \sqrt{1 - \frac{H^2}{ri^2}}\right]} + \sum A_j H^j,$$

where "xi" represents a depth of the aspherical surface and "H" represents a height from the optical axis.

The respective values in the numerical value embodiments of the zoom lens 1 according to the first preferred embodiment are presented in Table 1.

TABLE 1

| Si | ri | di | ni | vi |
|---|---|---|---|---|
| s1 | r1 = −20.136 | d1 = 0.313 | n1 = 1.88300 | v1 = 40.8 |
| s2 | r2 = 6.978 | d2 = 0.587 | | |
| s3 | r3 = ∞ | d3 = 2.577 | n2 = 1.83481 | v2 = 42.7 |
| s4 | r4 = −6.794 | d4 = 0.078 | | |
| s5 | r5 = 9.228 | d5 = 0.215 | n3 = 1.92286 | v3 = 20.9 |
| s6 | r6 = 3.996 | d6 = 0.785 | n4 = 1.51680 | v4 = 64.2 |
| s7 | r7 = 59.327 | d7 = 0.078 | | |
| s8 | r8 = 3.907 | d8 = 0.625 | n5 = 1.83481 | v5 = 42.7 |
| s9 | r9 = 68.355 | d9 = variable | | |
| S10 | r10 = 8.681 | d10 = 0.176 | n6 = 1.88300 | v6 = 40.8 |
| s11 | r11 = 1.765 | d11 = 0.489 | | |
| S12 | r12 = −1.856 | d12 = 0.156 | n7 = 1.88300 | v7 = 40.8 |
| S13 | r13 = 1.728 | d13 = 0.479 | n8 = 1.92286 | v8 = 20.9 |
| S14 | r14 = −9.711 | d14 = variable | | |
| S15 | r15 = ∞ (diaphragm) | d15 = 0.692 | | |
| S16 | r16 = 2.762 | d16 = 0.794 | n9 = 1.51680 | v9 = 64.2 |
| s17 | r17 = −21.701 | d17 = variable | | |
| s18 | r18 = 2.823 | d18 = 0.156 | n10 = 1.92286 | v10 = 20.9 |
| s19 | r19 = 1.698 | d19 = 1.110 | n11 = 1.51680 | v11 = 64.2 |
| s20 | r20 = −3.111 | d20 = variable | | |
| s21 | r21 = ∞ (filter) | d21 = 0.809 | nFL = 1.51680 | vFL = 64.2 |
| s22 | r22 = ∞ (filter) | d22 = 0.313 (Back Focus) | | |

Both surfaces s16, s17 of the single convex lens L9 of the third lens group Gr3, and a surface s20 on the image side of the double convex lens L11 of the fourth lens group Gr4 are formed in an aspheric surface. The fourth-order, sixth-order, and eighth-order aspheric surface factors A4, A6, and A8 of the above respective surfaces s16, s17, and s20 are presented in Table 2.

TABLE 2

| | Aspheric surface factor | | |
|---|---|---|---|
| | A4 | A6 | A8 |
| s16 | $-0.7793 \times 10^{-2}$ | $-0.8078 \times 10^{-2}$ | $-0.8211 \times 10^{-3}$ |
| s17 | $+0.6459 \times 10^{-2}$ | $-0.8733 \times 10^{-2}$ | $-0.8647 \times 10^{-3}$ |
| s20 | $+0.1245 \times 10^{-1}$ | $+0.8698 \times 10^{-3}$ | $-0.8647 \times 10^{-3}$ |

In the zoom lens 1, axial spacing d9, d14, d17, and d20 vary depending on zooming. Focal length, F number Fno, angle of field (2ω), and axial spacing d9, d14 d17, d20 in a wide angle end, a middle focal position, and a telephoto end are presented in Table 3.

TABLE 3

| | Wide angle end | Middle focal position | Telephoto end |
|---|---|---|---|
| Focal length | 1.00 | 3.42 | 5.40 |
| Fno | 1.85 | 2.20 | 2.54 |
| Angle of field(2ω) | 78.0 | 22.6 | 14.28 |
| d9 | 0.156 | 2.108 | 2.677 |
| D14 | 2.780 | 0.829 | 0.260 |
| D17 | 1.250 | 0.597 | 0.898 |
| D20 | 2.231 | 2.884 | 2.583 |

Figure 2:
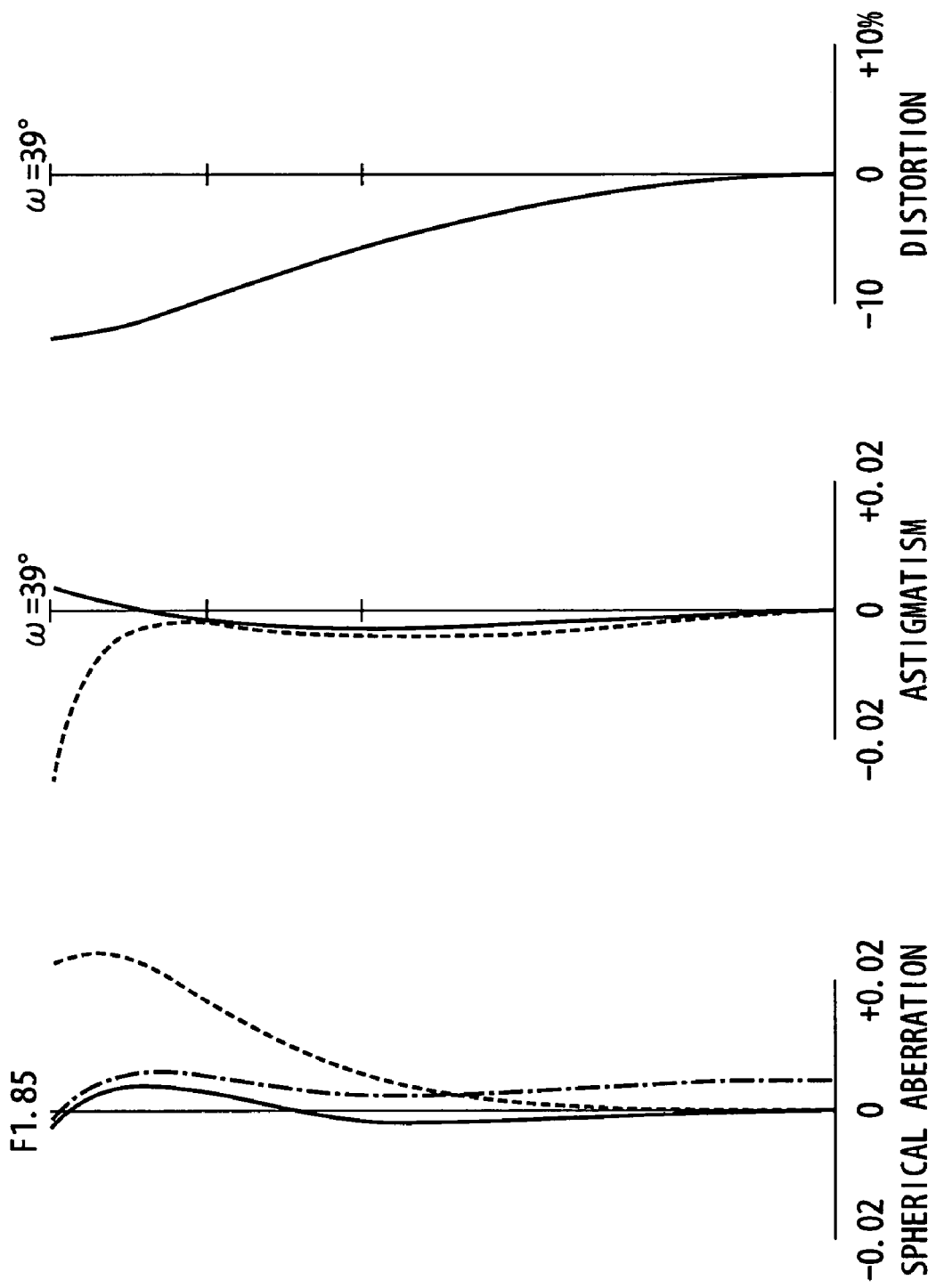
FIG. 2 is a diagram showing spherical aberration, astigmatism and distortion at a wide angle end.
Figure 3:
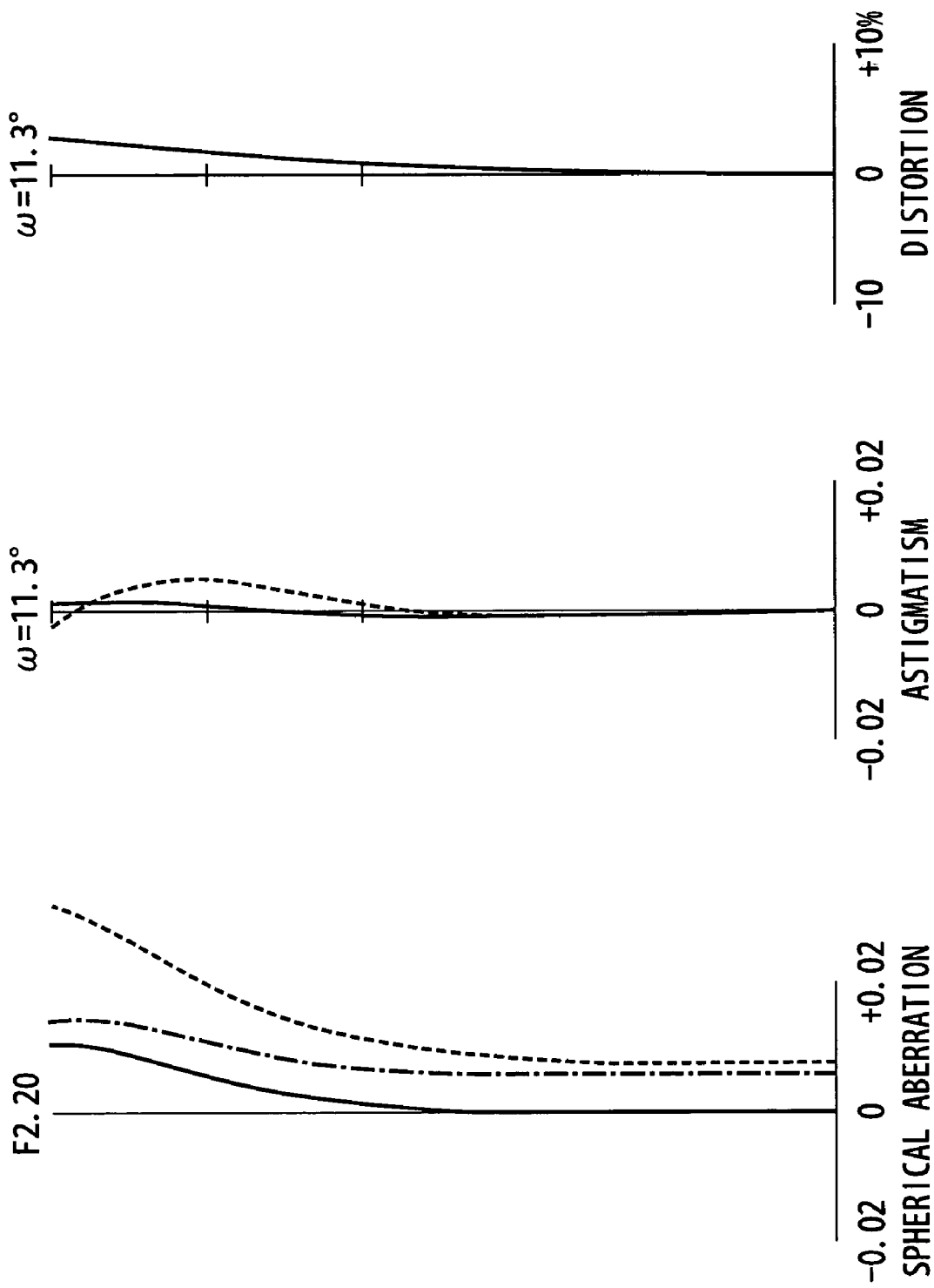
FIG. 3 is a diagram showing spherical aberration, astigmatism and distortion at a middle focal position between a wide angle end and a telephoto end.
Figure 4:
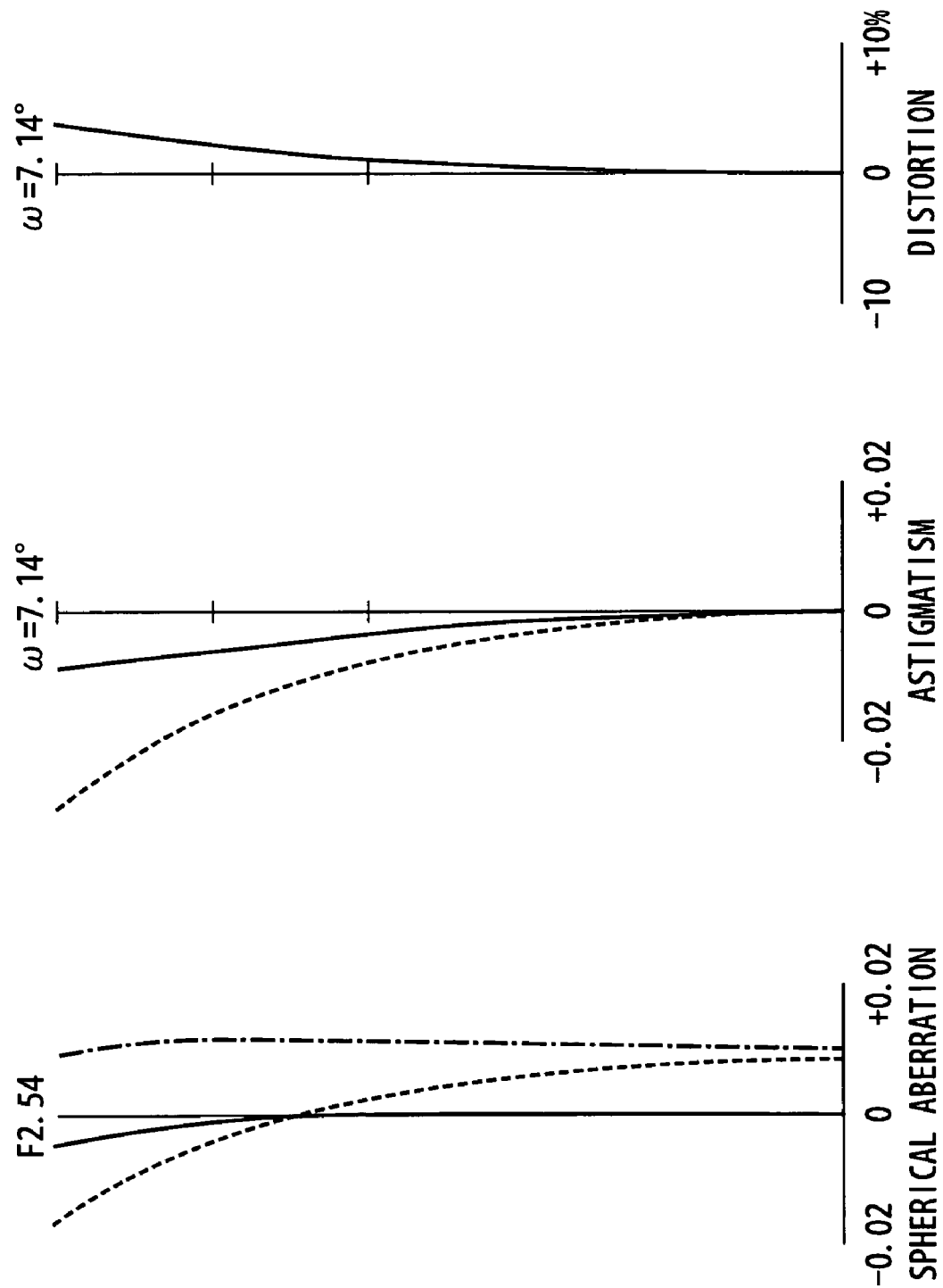
FIG. 4 is a diagram showing spherical aberration, astigmatism and distortion at a telephoto end.

FIG. 2 through FIG. 4 illustrate the spherical aberration, the distortion, and the astigmatism of the zoom lens 1 in the above numerical value embodiments. In the spherical aberration diagram, the solid line indicates the value of an e-line; the broken line indicates the value of a g-line (435.8 nm in wavelength); and the alternate long and short dash line indicates the value of a C-line (656.3 nm in wavelength). In the astigmatism diagram, the solid line indicates the value of sagittal image surface distortion; and the broken line indicates the value of meridional image surface distortion.

Next, the values of the respective conditional expressions (1) through (8) in the above numerical value embodiments of the zoom lens 1 are shown in the following.

(1) h1-4/h1-1=1.3485

(2) d1-2/d1-3=0.228

(3) n1-2=1.83481

(4) H1'/f1=0.2477, f1=3.953

(5) (n2-1+n2-2)/2=1.88300

(6) f3/r3-2=−0.221, f3=4.794

(7) r4+1/r4-3=−0.9076

(8) r4-2/f4=0.4151, f4=4.091

The respective values in the numerical value embodiments of the zoom lens 2 according to the second preferred embodiment are presented in Table 4.

TABLE 4

| Si | ri | di | ni | vi |
|---|---|---|---|---|
| s1 | r1 = −14.698 | d1 = 0.333 | n1 = 1.88300 | v1 = 40.8 |
| s2 | r2 = 6.801 | d2 = 0.561 | | |
| s3 | r3 = ∞ | d3 = 3.149 | n2 = 1.85000 | v2 = 43.0 |
| s4 | r4 = −6.319 | d4 = 0.078 | | |
| s5 | r5 = −71.436 | d5 = 0.254 | n3 = 1.92286 | v3 = 20.9 |
| s6 | r6 = 8.047 | d6 = 0.781 | n4 = 1.69680 | v4 = 55.5 |
| s7 | r7 = −11.279 | d7 = 0.078 | | |
| s8 | r8 = 3.875 | d8 = 0.679 | n5 = 1.77250 | v5 = 49.6 |
| s9 | r9 = 18.782 | d9 = variable | | |
| s10 | d10 = 10.076 | d10 = 0.176 | n6 = 1.88300 | v6 = 40.8 |
| s11 | r11 = 1.918 | d11 = 0.500 | | |
| s12 | r12 = −2.091 | d12 = 0.156 | n7 = 1.88300 | v7 = 40.8 |
| s13 | r13 = 1.666 | d13 = 0.490 | n8 = 1.92286 | v8 = 20.9 |
| s14 | r14 = −12.657 | d14 = variable | | |
| s15 | r15 = ∞ (diaphragm) | d15 = 0.589 | | |
| s16 | r16 = 3.728 | d16 = 0.693 | n9 = 1.77310 | v9 = 47.2 |
| s17 | r17 = −9.413 | d17 = 0.078 | | |
| s18 | r18 = 2.116 | d18 = 1.747 | n10 = 1.51680 | v10 = 64.2 |
| s19 | r19 = −3.404 | d19 = 0.157 | n11 = 1.92286 | v11 = 20.9 |
| s20 | r20 = 2.019 | d20 = variable | | |
| s21 | R21 = 1.829 | d21 = 0.753 | n12 = 1.58313 | v12 = 59.5 |
| s22 | r22 = −4.055 | d22 = variable | | |
| s23 | r23 = ∞ (filter) | d23 = 0.810 | nFL = 1.51680 | vFL = 64.2 |
| s24 | r24 = ∞ (filter) | d24 = 0.313 (Back Focus) | | |

A surface s16 of the convex lens G9 of the third lens group Gr3, and both surfaces s21, s22 of the single convex lens G12 of the fourth lens group Gr4 are formed in an aspheric surface. The fourth-order, sixth-order, and eighth-order aspheric surface factors A4, A6, and A8 of the above respective surfaces s16, s21, and s22 are presented in Table 5.

TABLE 5

| | Aspheric surface factor | | |
|---|---|---|---|
| | A4 | A6 | A8 |
| s16 | $-0.4018 \times 10^{-2}$ | $+0.6566 \times 10^{-3}$ | $-0.9748 \times 10^{-4}$ |
| s21 | $-0.3153 \times 10^{-1}$ | 0 | 0 |
| s22 | $+0.2686 \times 10^{-1}$ | 0 | $+0.2388 \times 10^{-2}$ |

In the zoom lens 2, axial spacing d9, d14, d20 and d22 vary depending on zooming. Focal length, F-number Fno, angle of field (2ω), and axial spacing d9, d14, d20, d22 in a wide angle end, a middle focal position and a telephoto end are presented in Table 6.

TABLE 6

| | Wide angle end | Middle focal position | Telephoto end |
|---|---|---|---|
| Focal length | 1.00 | 2.89 | 5.32 |
| Fno | 1.85 | 2.21 | 2.70 |
| Angle of field(2ω) | 78.4 | 26.4 | 14.12 |
| d9 | 0.176 | 1.969 | 2.745 |
| D14 | 2.899 | 1.107 | 0.330 |
| D20 | 0.840 | 0.350 | 0.841 |
| D22 | 0.634 | 1.124 | 0.634 |

Figure 6:
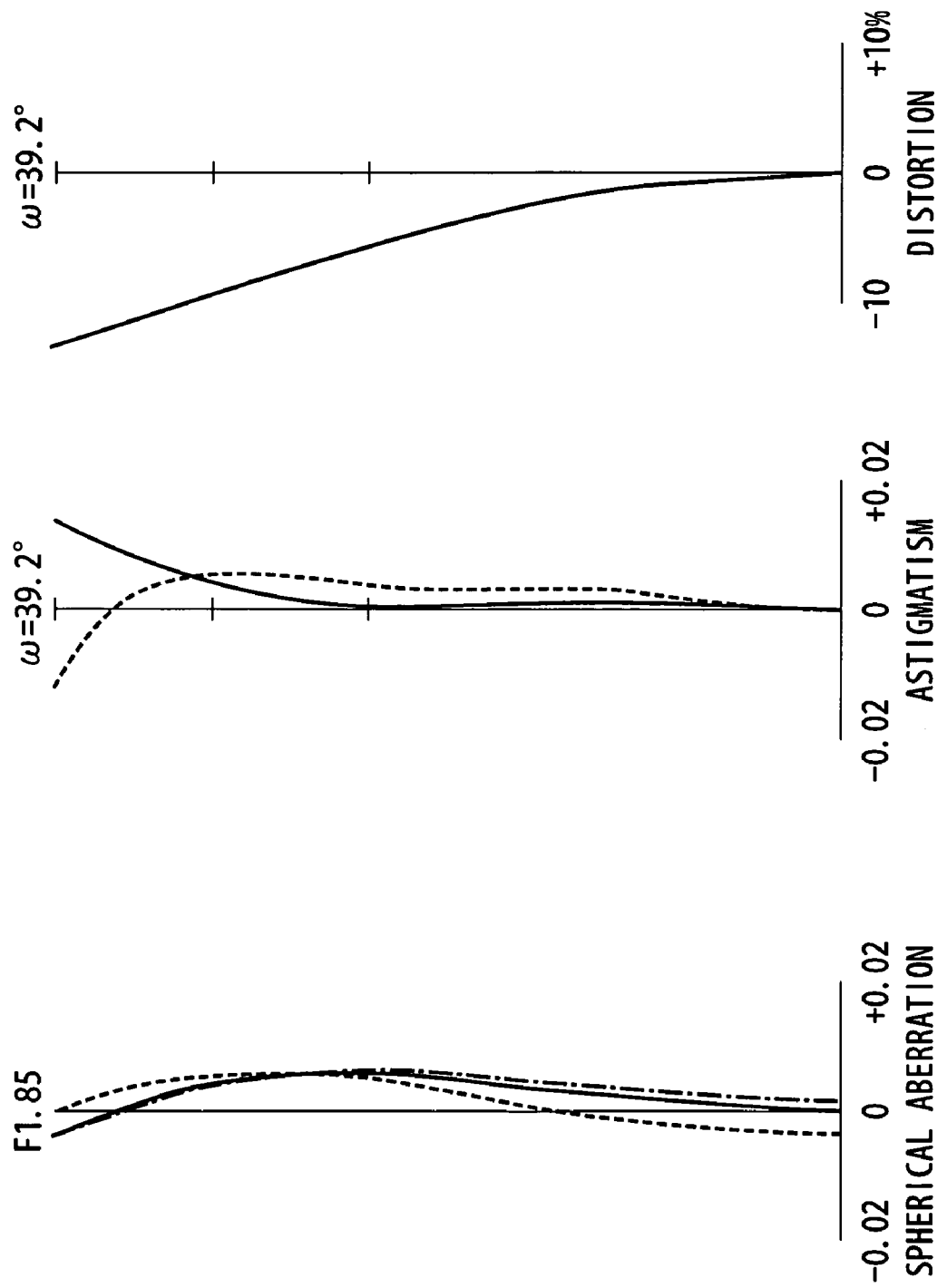
FIG. 6 is a diagram showing spherical aberration, astigmatism and distortion at a wide angle end.
Figure 7:
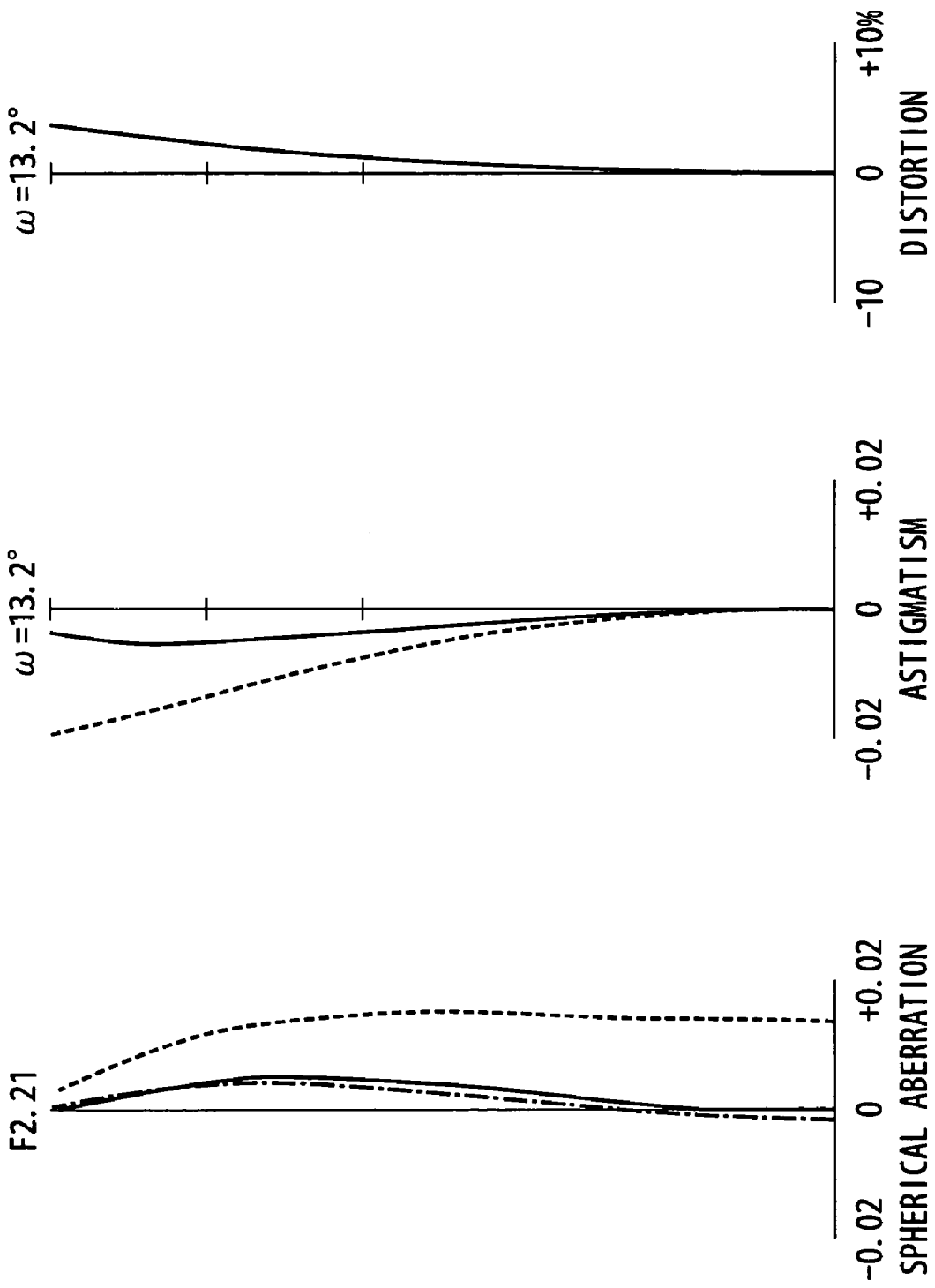
FIG. 7 is a diagram showing spherical aberration, astigmatism and distortion at a middle focal position between a wide angle end and a telephoto end.
Figure 8:
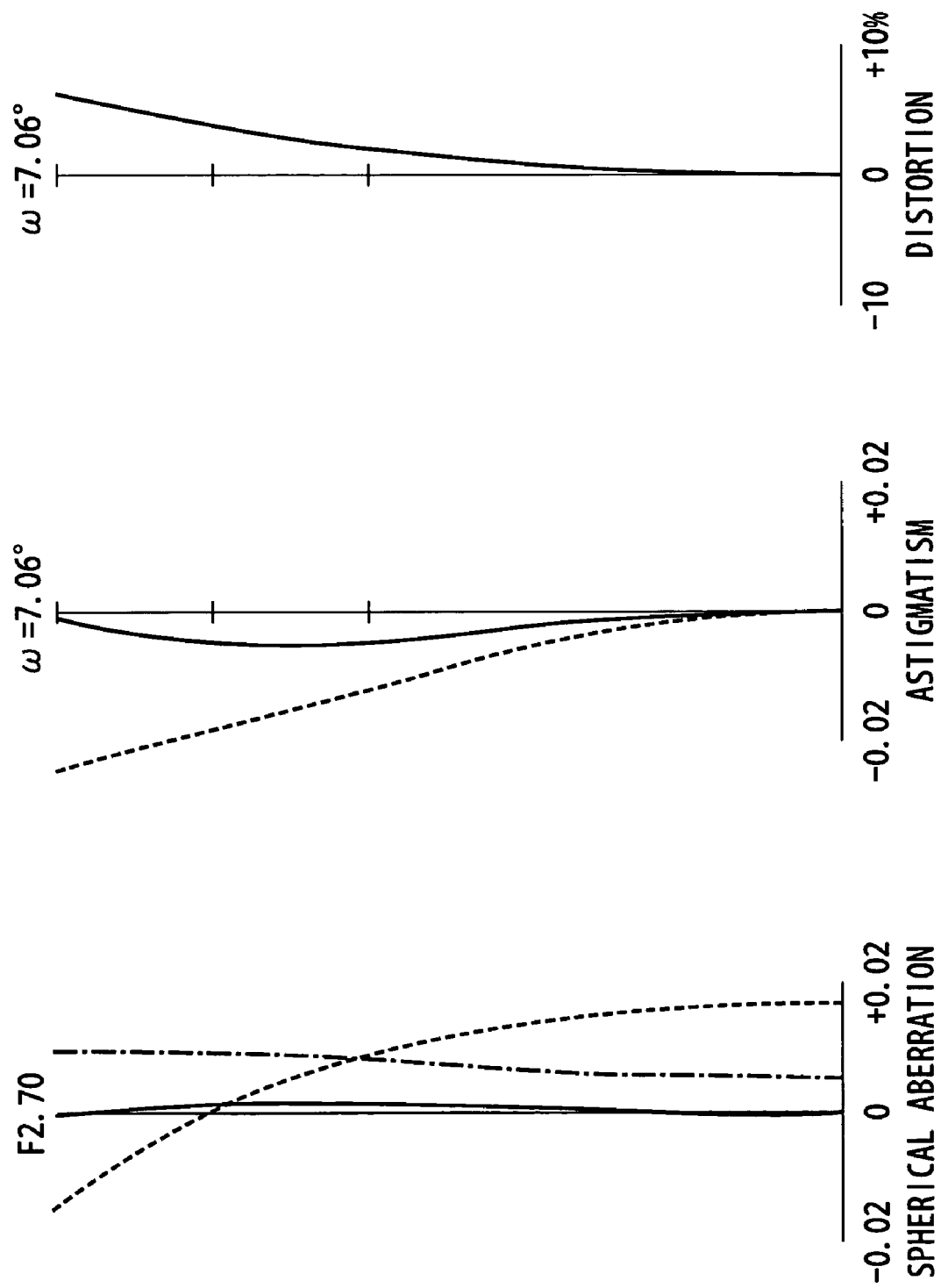
FIG. 8 is a diagram showing spherical aberration, astigmatism and distortion at a telephoto end.

FIG. 6 through FIG. 8 illustrate the spherical aberration, the distortion and the astigmatism of the zoom lens 2 in the above numerical value embodiments. In the spherical aberration diagram, the solid line indicates the value of an e-line; the broken line indicates the value of a g-line (435.8 nm in wavelength); and the alternate long and short dash line indicates the value of a C-line (656.3 nm in wavelength). In the astigmatism diagram, the solid line indicates the value of sagittal image surface distortion; and the broken line indicates the value of meridional image surface distortion.

Next, the values of the respective conditional expressions (1) through (5), (9) and (10) in the above numerical value embodiments of the zoom lens 2 are shown in the following.

(1) h1-4/h1-1=1.4461

(2) d1-2/d1-3=0.178

(3) n1-2=1.83500

(4) H1'/f1=0.3488, f1=3.705

(5) (n2-1+n2-2)/2=1.88300

(8) h3-5/h3-1=0.533

(9) f3/f3-1=−0.843, f3=2.981

The respective values in the numerical value embodiments of the zoom lens 3 according to the third preferred embodiment are presented in Table 7.

TABLE 7

| Si | ri | di | ni | vi |
|---|---|---|---|---|
| s1 | r1 = −28.4470 | d1 = 0.8 | n1 = 1.88300 | v1 = 40.8 |
| s2 | r2 = 23.1427 | d2 = 1.6311 | | |
| s3 | r3 = ∞ | d3 = 7.1580 | n2 = 1.83481 | v2 = 42.7 |
| s4 | r4 = −16.6167 | d4 = 0.3103 | | |
| s5 | r5 = 22.9139 | d5 = 0.6 | n3 = 1.84666 | v3 = 23.8 |
| s6 | r6 = 11.9511 | d6 = 1.9324 | n4 = 1.58913 | v4 = 61.2 |
| s7 | r7 = 35.9589 | d7 = 0.1 | | |
| s8 | r8 = 11.7395 | d8 = 1.9198 | n5 = 1.69350 | v5 = 53.3 |
| s9 | r9 = 79.5152 | d9 = variable | | |
| s10 | r10 = 9.8681 | d10 = 0.6 | n6 = 1.88300 | v6 = 40.8 |
| s11 | r11 = 4.0479 | d11 = 1.7056 | | |
| s12 | r12 = −4.6659 | d12 = 0.6353 | n7 = 1.77250 | v7 = 49.6 |
| s13 | r13 = 4.4788 | d13 = 1.1190 | n8 = 1.84666 | v8 = 23.8 |
| s14 | r14 = 741.4375 | d14 = variable | | |
| s15 | r15 = 7.8454 | d15 = 1.3359 | n9 = 1.58313 | v9 = 59.5 |
| s16 | r16 = −78.4964 | d16 = 1.0464 | | |
| s17 | r17 = ∞ (diaphragm) | d17 = variable | | |
| s18 | r18 = 8.6702 | d18 = 0.7772 | n10 = 1.58313 | v10 = 59.5 |
| s19 | r19 = ∞ | d19 = 0.55 | n11 = 1.84666 | v11 = 23.8 |
| s20 | r20 = 6.1465 | d20 = 1.6626 | n12 = 1.69680 | v12 = 55.5 |
| s21 | r21 = −7.7211 | d21 = variable | | |
| s22 | r22 = ∞ (filter) | d22 = 0.81 | nFL = 1.51680 | vFL = 64.2 |
| s23 | r23 = ∞ (filter) | d23 = 0.3 (Back Focus) | | |

A surface s8 on an object side of the convex lens L5 of the first lens group Gr1, a surface s15 on the object side of the single convex lens L9 of the third lens group Gr3, and a surface s18 on the object side of the convex lens L10 of the fourth lens group Gr4 are formed in an aspheric surface. The fourth-order, sixth-order, eighth-order and tenth-order aspheric surface factors A4, A6, A8, and A10 of the above respective surfaces s8, s15, and s18 are presented in Table 8.

TABLE 8

| | Aspheric surface factor | | | |
|---|---|---|---|---|
| | A4 | A6 | A8 | A10 |
| s8 | −0.54 × 10$^{-3}$ | 0.18 × 10$^{-6}$ | −0.62 × 10$^{-8}$ | 0.12 × 10$^{-9}$ |
| s15 | −0.33 × 10$^{-3}$ | −0.68 × 10$^{-4}$ | 0.86 × 10$^{-5}$ | −0.48 × 10$^{-6}$ |
| s18 | −0.15 × 10$^{-2}$ | 0.37 × 10$^{-4}$ | −0.82 × 10$^{-5}$ | 0.58 × 10$^{-6}$ |

In the zoom lens 3, axial spacing d9, d14, d17, and d21 vary depending on zooming. Focal length, F-number Fno, angle of field (2ω), and axial spacing d9, d14, d17, d21 in a wide angle end, a middle focal position and a telephoto end are presented in Table 9.

TABLE 9

| | Wide angle end | Middle focal position | Telephoto end |
|---|---|---|---|
| Focal length | 1.66 | 5.24 | 16.57 |
| Fno | 1.75 | 1.93 | 2.07 |
| Angle of field(2ω) | 76.2 | 24.2 | 7.7 |
| d9 | 0.6695 | 7.2471 | 11.3733 |
| D14 | 11.5083 | 4.9262 | 0.8 |
| D17 | 3.6681 | 1.9519 | 1.4864 |
| D21 | 4.8648 | 6.5809 | 7.0464 |

Figure 10:
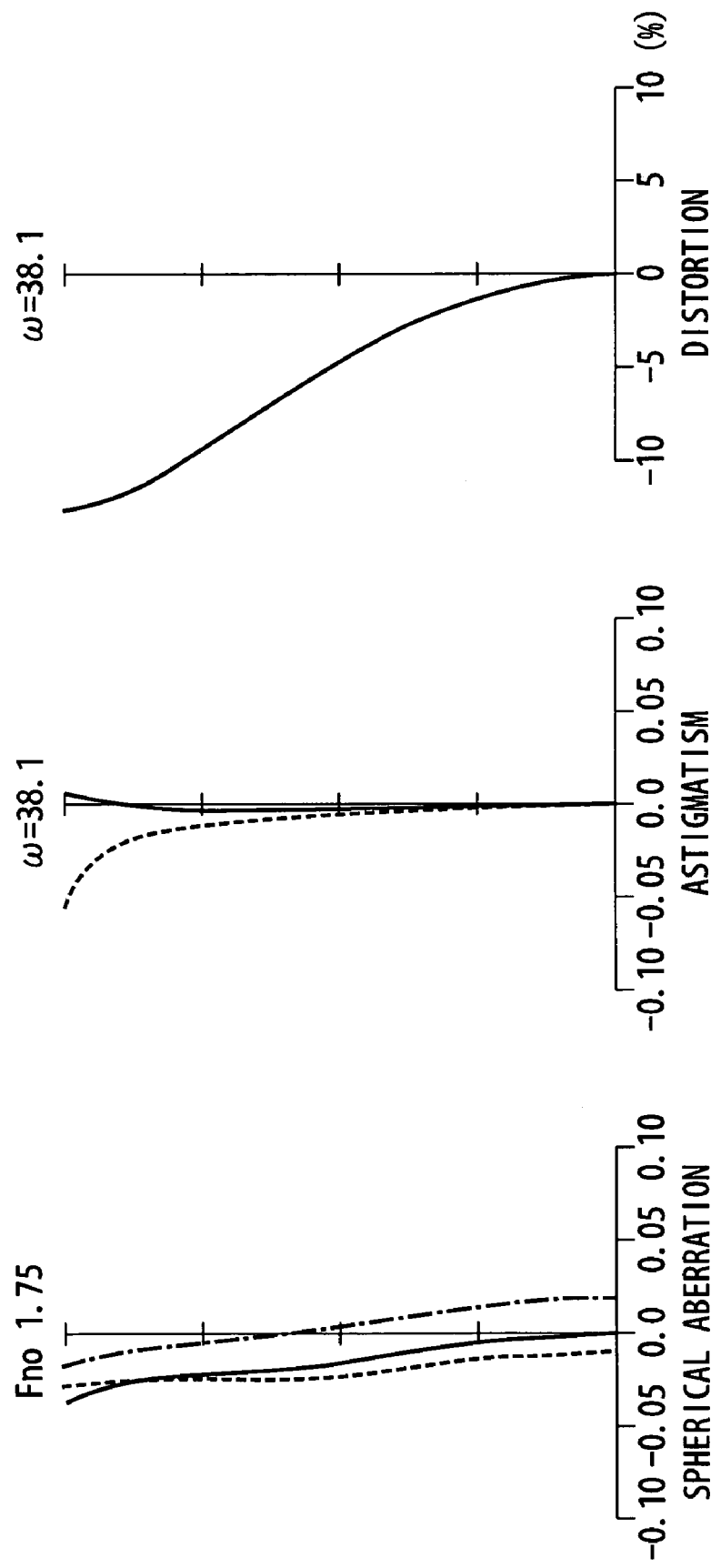
FIG. 10 is a diagram showing spherical aberration, astigmatism and distortion at a wide angle end.
Figure 11:
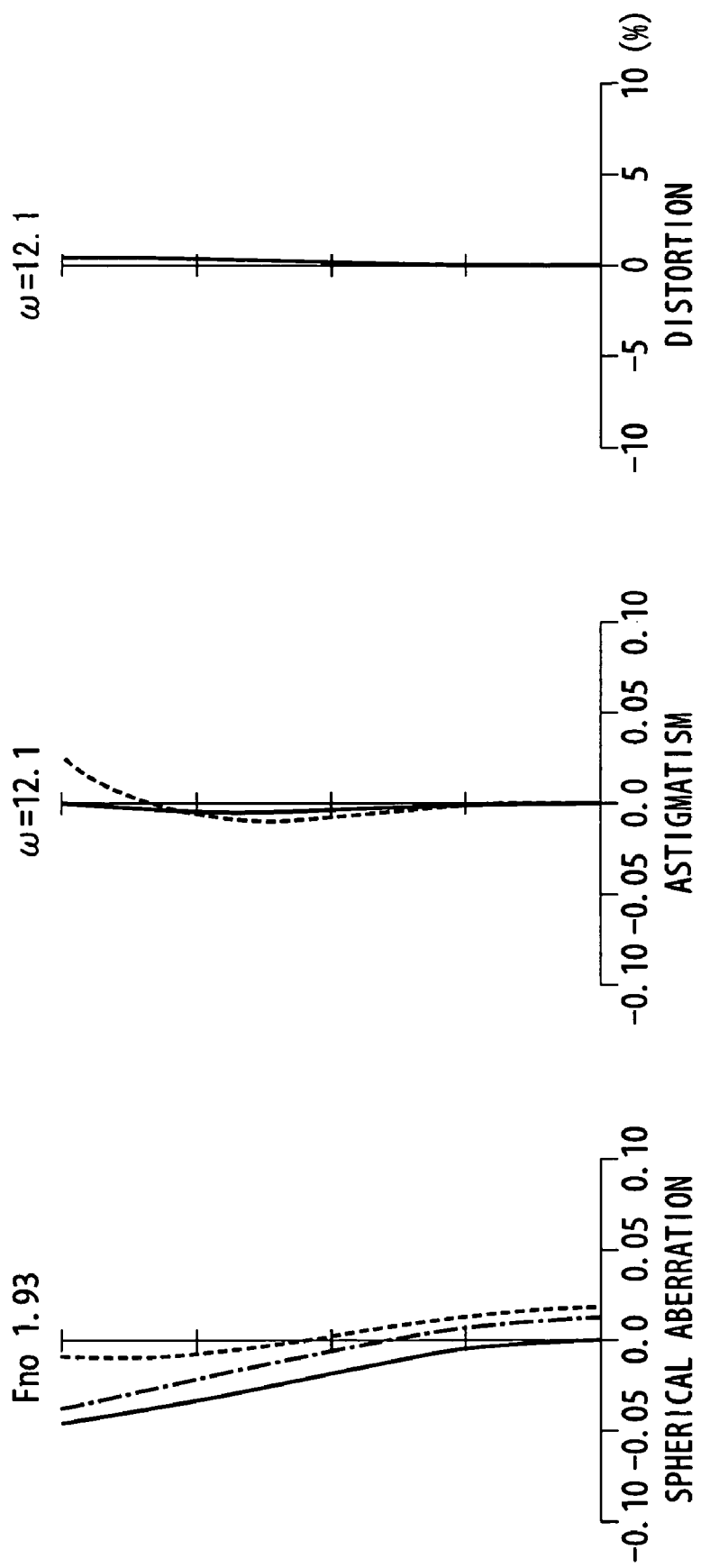
FIG. 11 is a diagram showing spherical aberration, astigmatism and distortion at a middle focal position between a wide angle end and a telephoto end.
Figure 12:
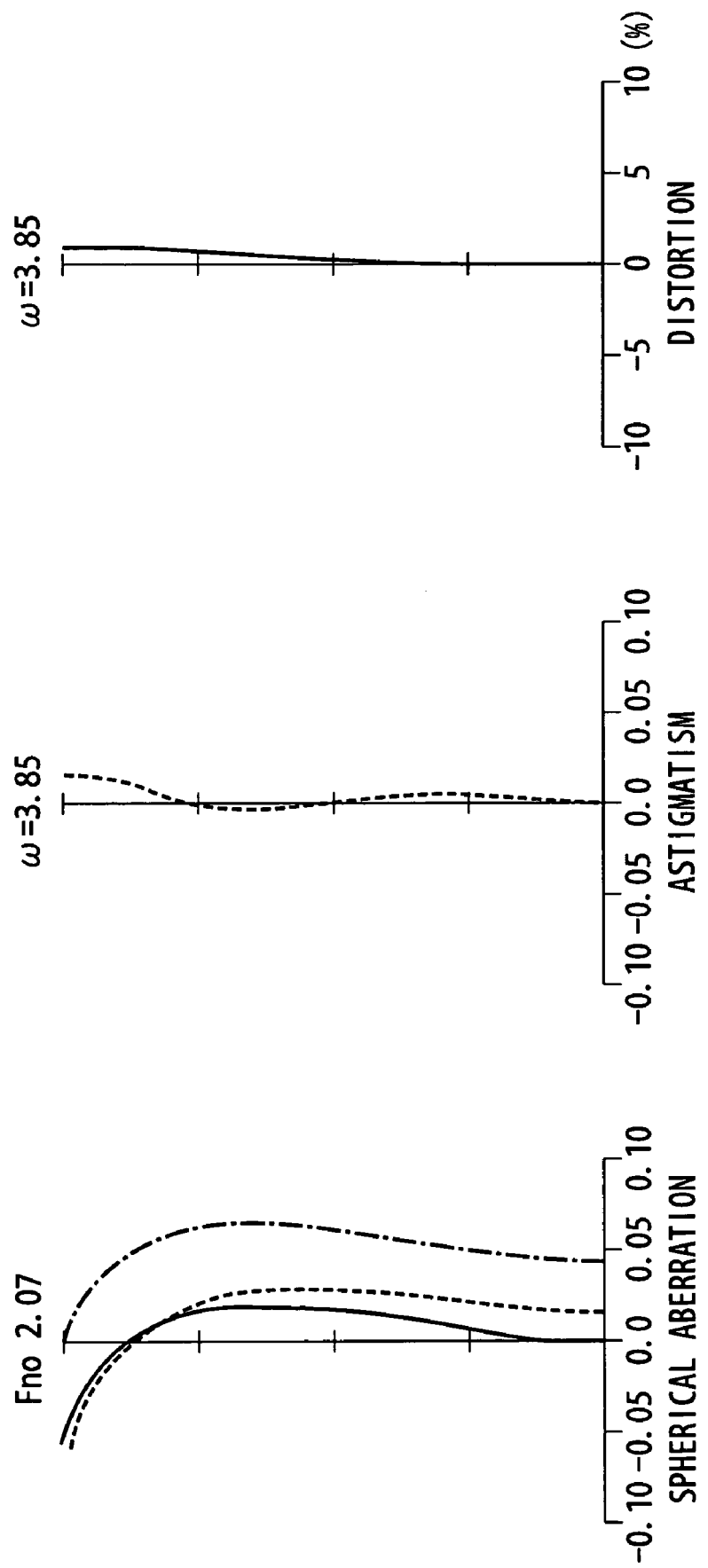
FIG. 12 is a diagram showing spherical aberration, astigmatism and distortion at a telephoto end.

FIG. 10 through FIG. 12 illustrate the spherical aberration, the distortion and the astigmatism of the zoom lens 3 in the above numerical value embodiments. In the spherical aberration diagram, the solid line indicates the value of an e-line; the broken line indicates the value of a g-line (435.8 nm in wavelength); and the alternate long and short dash line indicates the value of a C-line (656.3 nm in wavelength). In the astigmatism diagram, the solid line indicates the value of sagittal image surface distortion; and the broken line indicates the value of meridional image surface distortion.

Next, the values of the respective conditional expressions (1) through (5), (11) and (12) in the above numerical value embodiments of the zoom lens 3 are shown in the following.

(1) h1-4/h1-1=1.400

(2) d1-2/d1-3=0.228

(3) n1-2=1.835

(4) H1'/f1=0.265

(5) (n2-1+n2-2)/2=1.828

(11) n4-2=1.847

(12) f3/f4=0.65

The respective values in the numerical value embodiments of the zoom lens 4 according to the fourth preferred embodiment are presented in Table 10.

TABLE 10

| Si | ri | di | ni | vi |
|---|---|---|---|---|
| s1 | r1 = −134.7480 | d1 = 0.9 | n1 = 1.88300 | v1 = 40.8 |
| s2 | r2 = 14.0169 | d2 = 2.8277 | | |
| s3 | r3 = ∞ | d3 = 7.2 | n2 = 1.83481 | v2 = 42.7 |
| s4 | r4 = −21.7936 | d4 = 0.3 | | |
| s5 | r5 = 31.7581 | d5 = 0.9 | n3 = 1.84666 | v3 = 23.8 |
| s6 | r6 = 12.3060 | d6 = 2.85 | n4 = 1.69680 | v4 = 55.5 |
| s7 | r7 = 35 | d7 = 0.3 | | |
| s8 | r8 = 14.4794 | d8 = 2.4486 | n5 = 1.80420 | v5 = 46.5 |
| s9 | r9 = −153.0462 | d9 = variable | | |
| s10 | r10 = −72.8852 | d10 = 0.7 | n6 = 1.834 | v6 = 37.3 |
| s11 | r11 = 4.6392 | d11 = 1.5177 | | |
| s12 | r12 = −6.4592 | d12 = 0.4 | n7 = 1.77250 | v7 = 49.6 |
| s13 | r13 = 4.3151 | d13 = 1.4199 | n8 = 1.84666 | v8 = 23.8 |
| s14 | r14 = −36.2647 | d14 = variable | | |
| s15 | r15 = ∞ (diaphragm) | d15 = 1.0326 | | |
| s16 | r16 = 9.6975 | d16 = 1.2318 | n9 = 1.80610 | v9 = 40.7 |
| s17 | r17 = −991.6604 | d17 = 0.2855 | | |

TABLE 10-continued

| Si | ri | di | ni | vi |
|---|---|---|---|---|
| s18 | r18 = 9.2949 | d18 = 2.5216 | n10 = 1.58144 | v10 = 40.9 |
| s19 | r19 = −75.9863 | d19 = 0.7988 | n11 = 1.84666 | v11 = 23.8 |
| s20 | r20 = 7.4277 | d20 = variable | | |
| s21 | r21 = 10.7553 | d21 = 2.1939 | n12 = 1.58913 | v12 = 61.2 |
| s22 | r22 = −4.8461 | d22 = 0.7 | n13 = 1.80518 | v13 = 25.5 |
| s23 | r23 = −7.8609 | d23 = variable | | |
| s24 | r24 = ∞ (filter) | d24 = 0.81 | nFL = 1.51680 | vFL = 64.2 |
| s25 | r23 = ∞ (filter) | d25 = 0.3 (Back Focus) | | |

A surface s17 on the image side of the convex lens L9 of the third lens group Gr3, and the surface s21 on the object side of the double convex lens L12 of the fourth lens group Gr4 are formed in an aspheric surface. The fourth-order, sixth-order, eighth-order, and tenth-order aspheric surface factors A4, A6, A8, and A10 of the above respective surfaces s17 and s21 are presented in Table 11.

TABLE 11

| | Aspheric surface factor | | | |
|---|---|---|---|---|
| | A4 | A6 | A8 | A10 |
| s17 | $0.17 \times 10^{-3}$ | $0.44 \times 10^{-5}$ | $-0.25 \times 10^{-6}$ | $0.51 \times 10^{-8}$ |
| s21 | $-0.60 \times 10^{-3}$ | $-0.29 \times 10^{-5}$ | $0.98 \times 10^{-6}$ | $-0.48 \times 10^{-7}$ |

In the zoom lens 4, axial spacing d9, d14, d20, and d23 vary depending on zooming. Focal length, F-number Fno, angle of field (2ω), and axial spacing d9, d14, d20, d23 in a wide angle end, a middle focal position and a telephoto end are presented in Table 12.

TABLE 12

| | Wide angle end | Middle focal position | Telephoto end |
|---|---|---|---|
| Focal length | 2.31 | 7.23 | 22.61 |
| Fno | 1.78 | 2.14 | 2.86 |
| Angle of field(2ω) | 78.0 | 25.0 | 8.4 |
| d9 | 0.8719 | 7.3280 | 11.4029 |
| D14 | 11.8310 | 5.3749 | 1.3 |
| D20 | 5.5386 | 2.3561 | 1.2019 |
| D23 | 7.5197 | 10.7022 | 11.8565 |

Figure 14:
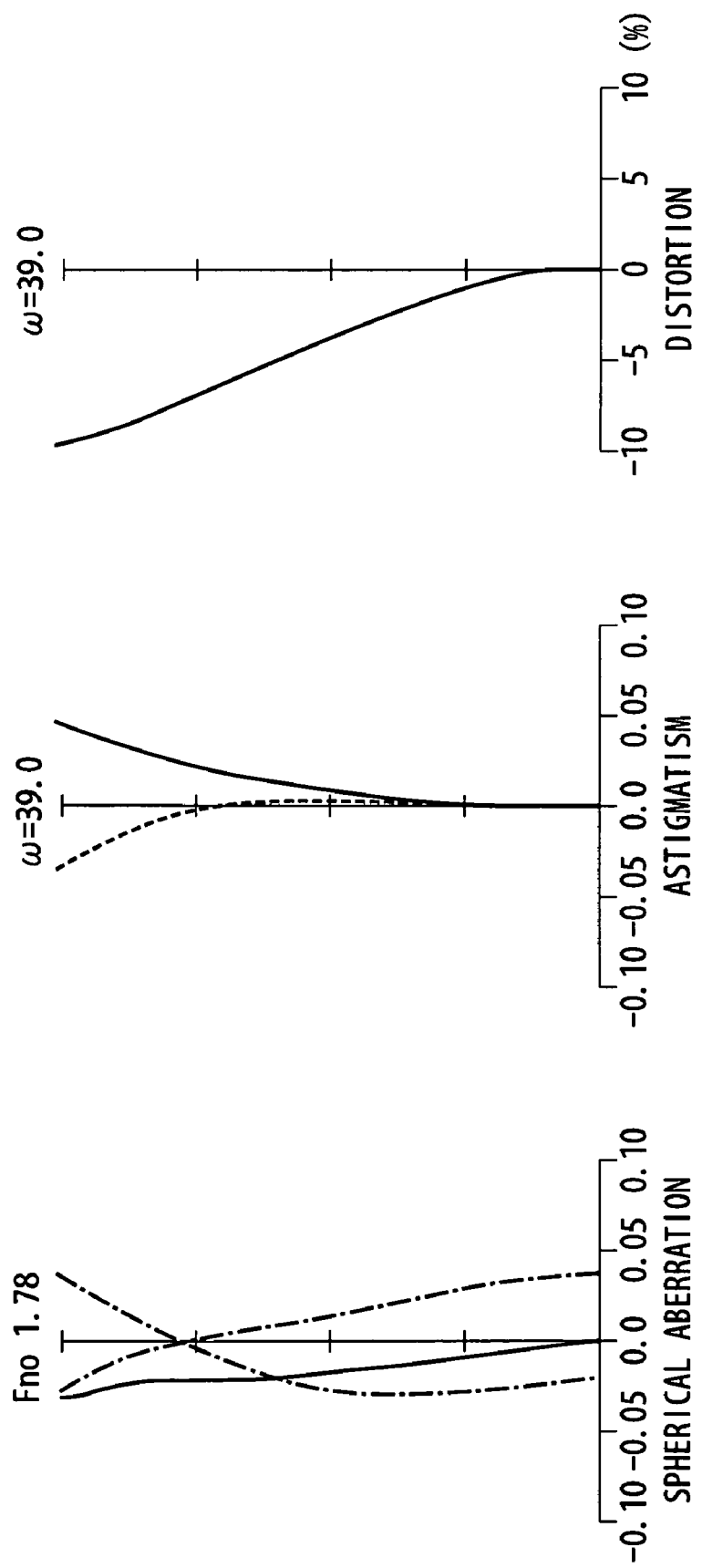
FIG. 14 is a diagram showing spherical aberration, astigmatism and distortion at a wide angle end.
Figure 15:
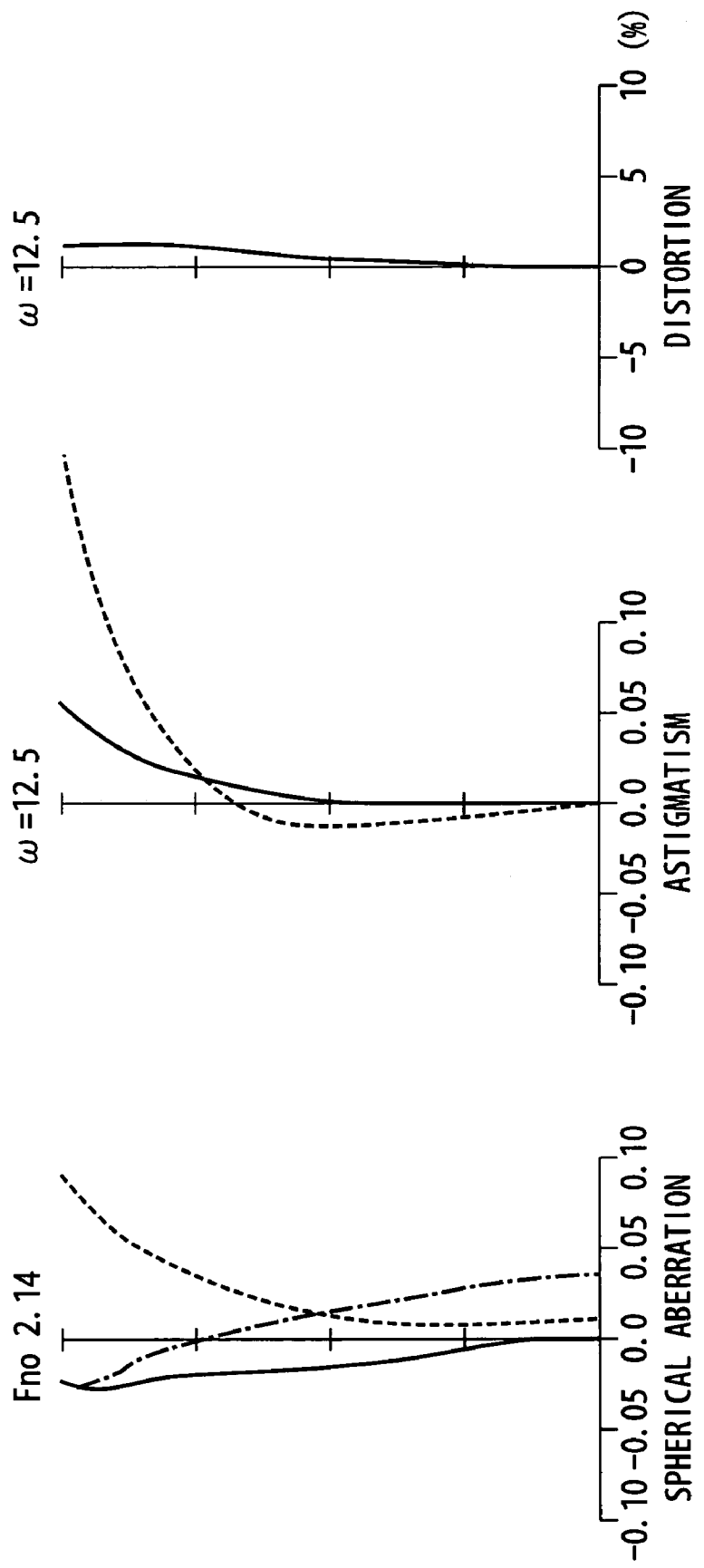
FIG. 15 is a diagram showing spherical aberration, astigmatism and distortion at a middle focal position between a wide angle end and a telephoto end.
Figure 16:
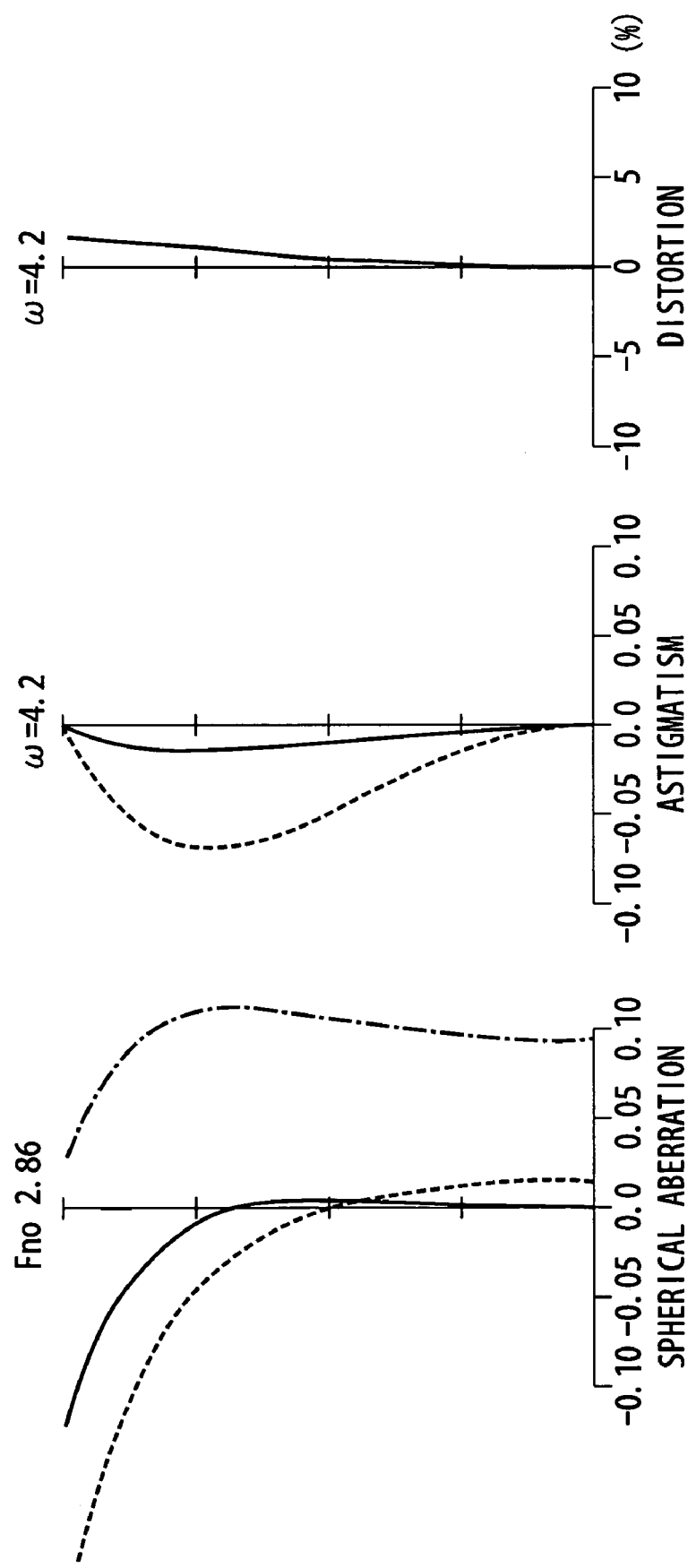
FIG. 16 is a diagram showing spherical aberration, astigmatism and distortion at a telephoto end.

FIG. 14 through FIG. 16 illustrate the spherical aberration, the distortion and the astigmatism of the zoom lens 4 in the above numerical value embodiments. In the spherical aberration diagram, the solid line indicates the value of an e-line; the broken line indicates the value of a g-line (435.8 nm in wavelength); and the alternate long and short dash line indicates the value of a C-line (656.3 nm in wavelength). In the astigmatism diagram, the solid line indicates the value of sagittal image surface distortion; and the broken line indicates the value of meridional image surface distortion.

Next, the values of the respective conditional expressions (1) through (5), (9), (11) and (13) in the above numerical value embodiments of the zoom lens 4 are shown in the following.

(1) h1-4/h1-1=1.400

(2) d1-2/d1-3=0.393

(3) n1-2=1.835

(4) H1'/f1=0.277

(5) (n2-1+n2-2)/2=1.803

(9) h3-5/h3-1=0.771

(11) n4-2=1.805

(13) f3/f3-1=1.261

All of the shapes and numerical values of the respective parts illustrated in the above-mentioned preferred embodiments are shown merely by way of example of implementation performed when putting the present invention into practice, and the technical scope of the present invention should not be interpreted restrictively by these.

As apparent from the foregoing description, a zoom lens of the present invention (1) made up of a first lens group having positive refracting power, a second lens group having negative refracting power, a third lens group having positive refracting power, and a fourth lens group having positive refracting power, which are disposed in order from an object side, wherein the first lens group and the third lens group are stationary, and the zoom lens performs mainly variable power by shifting the second lens group in an optical axis direction, and performs correction for image position fluctuations and focusing by shifting the fourth lens group in the optical axis direction, is characterized by that the first lens group is composed of five lenses: a concave lens; a convex lens with a strong convexity facing to an image side; a cemented lens made up of a concave lens with a strong concavity facing to the image side and a convex lens; and a convex lens with a strong convexity facing to the object side, which are disposed in order from the object side, and configured so as to satisfy the following conditional expressions:

$$1.25 < h1\text{-}4/h1\text{-}1 < 1.55; \quad (1)$$

$$d1\text{-}2/d1\text{-}3 < 0.4; \quad (2)$$

$$1.65 < n1\text{-}2; \quad (3)$$

and $$0.1 < H1'/f1 < 0.6, \quad (4)$$

where f1 is a focal length of the first lens group; h1-i is a paraxial ray height in the i-th surface from the object side when allowing a paraxial ray parallel to an optical axis to enter the first lens group; d1-i is axial spacing from the i-th surface to the (i+1)-th surface in the first lens group; n1-i is a refractive index on a d-line of the i-th lens in the first lens group; and H1' is spacing from a vertex of a surface closest to the image side in the first lens group to a principal point on the image side in the first lens group ("−" indicates the object side, and "+" indicates the image side).

Therefore, the zoom lens of the present invention enables to correct various aberrations and also achieve the compatibility between widening of angle and miniaturization of front lens diameter. For example, in the performance in which zoom ratio is approximately ten times, the angle of view of a wide angle end exceeds 76 degrees, and the F-number of the wide angle end is approximately F1.7 to F1.8, it is possible to accomplish such extreme miniaturization that the front lens diameter is approximately five to seven times of diagonal dimension.

In the present invention (2), a second lens group is composed of three lenses: a concave meniscus lens with a strong concavity facing to an image side; and a cemented lens made up of a double concave lens and a convex lens, which are disposed in order from the object side, and configured so as to satisfy the conditional expression:

$$1.8<(n2\text{-}1+n2\text{-}2)/2, \quad (5)$$

where n2-1 is a refractive index on a d-line of the concave meniscus lens of the second lens group; and n2-2 is a refractive index on a d-line of the double concave lens of the second lens group. Therefore, by preventing Petzval sum from being too small, the Petzval sum can be optimized, and the correction for curvature of field is facilitated, thereby enabling to obtain an excellent image.

In the present inventions (3) and (4), a third lens group made up of a single convex lens and at least one surface is an aspheric surface. A fourth lens group is composed of a cemented lens made up of a concave meniscus lens with a concavity facing to an image side, and a double convex lens, a surface on the image side of which is an aspheric surface, which are disposed in order from the object side. These are configured so as to satisfy the following respective conditional expressions:

$$-0.4<f3/r3\text{-}2<0.4; \quad (6)$$

$$-1.25<r4\text{-}1/r4\text{-}3<-0.8; \quad (7)$$

and $$0.3<r4\text{-}2/f4<0.6, \quad (8)$$

where f3 is a focal length of the third lens group; f4 is a focal length of the fourth lens group; r3-2 is a radius of curvature of a surface on the image side of the convex lens in the third lens group; r4-1 is a radius of curvature of a surface on the object side of the concave meniscus lens in the fourth lens group; r4-2 is a radius of curvature of a cemented surface in the fourth lens group; and r4-3 is a radius of curvature of a surface on the image side of the convex lens in the fourth lens group. Therefore, coma aberration, spherical aberration and curvature of field can be corrected properly in balance, and further, such sensitivity that the decentering between the respective lens and between the lens groups affects image quality can be relaxed to permit mass production with stable performance.

In the present inventions (5) and (6), a third lens group is composed of a convex lens and a cemented lens made up of a convex lens with a strong convexity facing to an object side and a concave lens with a strong concavity facing to an image side, which are disposed in order from the object side, and at least one surface is an aspheric surface. A fourth lens group is made up of a single convex lens, and at least one surface is an aspheric surface. These are configured so as to satisfy the following respective conditional expressions:

$$0.4<h3\text{-}5/h3\text{-}1<0.7; \quad (9)$$

and $$0.75<f3/f3\text{-}1<1, \quad (10)$$

where h3-i is a paraxial ray height in the i-th surface from the object side of the third lens group, when allowing a paraxial ray parallel to an optical axis to enter the first lens group at a wide angle end; f3 is a focal length of the third lens group; and f3-1 is a focal length of the single convex lens of the third lens group. Therefore, the total length can be shortened while suitably correcting various aberrations, thereby contributing to miniaturization.

In the present inventions (7) and (8), a third lens group is made up of a single convex lens, and at least one surface is an aspheric surface. A fourth lens group is composed of a cemented lens made up of a convex lens with a convexity facing to an object side, a concave lens, and a convex lens, which are disposed in order from the object side. Further, at least a surface closest to the object side is an aspheric surface. These are configured so as to satisfy the following respective conditional expressions:

$$n4\text{-}2>1.8; \quad (11)$$

and $$0.1<f3/f4<0.7, \quad (12)$$

where n4-2 is a refractive index on a d-line of the concave lens of the fourth lens group; f3 is a focal length of the third lens group; and f4 is a focal length of the fourth lens group. Therefore, effective correction for curvature of field is enabled by suppressing refraction fluctuations due to colors relating to chromatic aberration and spherical aberration, which are due to movement of the fourth lens group, and by correcting Petzval sum toward the plus side. Also, the overall system of a zoom lens can be minimized while suppressing spherical aberration fluctuations, without causing performance deterioration. In addition, it is possible to relax the performance deterioration due to manufacturing tolerance of the fourth lens group.

In the present inventions (9) and (10), a third lens group is composed of a convex lens and a cemented lens made up of a convex lens with a strong convexity facing to an object side and a concave lens with a strong concavity facing to an image side, which are disposed in order from the object side, and at least one surface is an aspheric surface. A fourth lens group is composed of a cemented lens made up of a double convex lens and a concave lens having a convexity on the image side, and at least one surface is an aspheric surface. These are configured so as to satisfy the following respective conditional expressions:

$$0.4<h3\text{-}5/h3\text{-}1<0.7; \quad (9)$$

$$n4\text{-}2>1.8; \quad (11)$$

and $$0.75<f3/f3\text{-}1<1.3, \quad (13)$$

where h3-i is a paraxial ray height in the i-th surface from the object side of the third lens group Gr3, when allowing a paraxial ray parallel to an optical axis to enter the first lens group Gr1 at a wide angle end; f3 is a focal length of the third lens group Gr3; f3-1 is a focal length of the single convex lens of the third lens group Gr3; and n4-2 is a refractive index on a d-line of the concave lens of the fourth lens group. Therefore, the total length can be shortened for miniaturization, while suitably correcting various aberrations.

An image pickup apparatus of the present invention (11) comprises: a zoom lens; image pickup means for converting an image captured by the zoom lens into an electric image signal; and image control means. The image control means is configured so as to form a new image signal subjected to coordinate conversion by shifting a point on an image defined by an image signal formed by the image pickup means, while referring to a conversion coordinate factor previously provided in response to a variable power rate through the zoom lens, and output the new image signal. The zoom lens is made up of a first lens group having positive refracting power, a second lens group having negative refracting power, a third lens group having positive refracting power, and a fourth lens group having positive refracting power, which are disposed in order from the object side. The first lens group and the third lens group are stationary, and the zoom lens performs mainly variable power by shifting the second lens group in an optical axis direction, and performs correction for image position fluctuations and focusing by shifting the fourth lens group in the optical axis direction. The first lens group is composed of five lenses: a concave lens; a convex lens with a strong convexity facing to an image side; a cemented lens made up of a concave lens with a strong concavity facing to the image side, and a convex lens; and a convex lens with a strong convexity facing to the object side, which are disposed in order from the object side. These are characterized by arranging so as to satisfy the following respective conditional expressions:

$$1.25 < h1\text{-}4/h1\text{-}1 < 1.55; \quad (1)$$

$$1\text{-}2/d1\text{-}3 < 0.4; \quad (2)$$

$$1.65 < n1\text{-}2; \quad (3)$$

and $$0.1 < H1'/f1 < 0.6, \quad (4)$$

where f1 is a focal length of the first lens group; h1-i is a paraxial ray height in the i-th surface from the object side when allowing a paraxial ray parallel to an optical axis to enter the first lens group; d1-i is axial spacing from the i-th surface to the (i+1)-th surface in the first lens group; n1-i is a refractive index on a d-line of the i-th lens in the first lens group; and H1' is spacing from a vertex of a surface closest to the image side in the first lens group to a principal point on the image side in the first lens group ("−" indicates the object side, and "+" indicates the image side).

Therefore, in the image pickup apparatus of the present invention (11), by actively and largely causing negative distortion at a wide angle end and positive distortion at a telephoto end, the shifts in the angle of view after distortion correction can be sufficiently greater for the shifts in paraxial focal length, thereby permitting miniaturization for a zoom ratio required.

In the present invention (12), the use of the zoom lens of the present invention (2) enables to prevent Petzval sum from being too small, and facilitate the correction for curvature of field.

In the present inventions (13) and (14), by using the zoom lens of the present inventions (3) and (4), coma aberration, spherical aberration, and curvature of field can be corrected properly in balance, and further, such sensitivity that the decentering between the respective lens and between the lens groups affects image quality can be relaxed to permit mass production with stable performance.

In the present inventions (15) and (16), by using the zoom lens of the present inventions (5) and (6), the total length can be shortened to contribute to miniaturization, while suitably correcting various aberrations.

In the present inventions (17) and (18), the refraction fluctuations due to colors relating to chromatic aberration and spherical aberration, which are due to movement of the fourth lens group, can be suppressed by using the zoom lens of the present inventions (7) and (8). By correcting Petzval sum toward the plus side, the effective correction for curvature of field is enabled, and the miniaturization of the overall system of the zoom lens is also enabled without causing performance deterioration. In addition, it is possible to relax the performance deterioration due to manufacturing tolerance of the fourth lens group.

In the present inventions (19) and (20), by using the zoom lens of the present inventions (9) and (10), the total length can be shortened for miniaturization, while suitably correcting various aberrations.

The invention claimed is:

1. A zoom lens consisting of a first lens group having positive refracting power, a second lens group having negative refracting power, a third lens group having positive refracting power, and a fourth lens group having positive refracting power, which are disposed in order from an object side, wherein the first lens group and the third lens groups are stationary, and the zoom lens performs mainly variable power by shifting the second lens group in an optical axis direction, and performs correction for image position fluctuations and focusing by shifting the fourth lens group in the optical axis direction, characterized in that:

said first lens group is composed of five lenses: a concave lens; a convex lens with a strong convexity facing to an image side; a cemented lens composed of a concave lens with a strong concavity facing to the image side, and a convex lens; and a convex lens with a strong convexity facing to the object side, which are disposed in order from the object side, and is configured so as to satisfy each of the following conditional expressions:

(1) $1.25 < h1\text{-}4/h1\text{-}1 < 1.55$;

(2) $d1\text{-}2/d1\text{-}3 < 0.4$;

(3) $1.65 < n1\text{-}2$;

and (4) $0.1 < H1'/f1 < 0.6$, where:

f1 is a focal length of the first lens group;

h1-i is a paraxial ray height in the i-th surface from the object side when allowing a paraxial ray parallel to an optical axis to enter the first lens group;

d1-i is axial spacing from the i-th surface to the (i+1)-th surface in the first lens group;

n1-i is a refractive index on a d-line of the i-th lens in the first lens group; and H1' is spacing from a vertex of a surface closest to the image side in the first lens group to a principal point on the image side in the first lens group ("−" indicates the object side, and "+" indicates the image side).

2. The zoom lens as claimed in claim 1, characterized in that the second lens group is composed of three lenses of a concave meniscus lens with a concavity facing to the image side, a double concave lens and a convex lens, which are disposed in order from the object side, and characterized by satisfying the following conditional expression (5):

$$1.8 < (n2\text{-}1 + n2\text{-}2)/2, \quad (5)$$

where:

n2-1 is a refractive index on a d-line of the concave meniscus lens of the second lens group; and n2-2 is a refractive index on a d-line of the double concave lens of the second lens group.

3. The zoom lens as claimed in claim 1, characterized in that:

the third lens group is composed of a single convex lens, and at least one surface is an aspheric surface; and the fourth lens group is composed of a cemented lens made up of a concave meniscus lens with a concavity facing to the image side, and a double convex lens whose surface on the image side is an aspheric surface, which are disposed in order from the object side, and characterized by satisfying each of the following conditional expressions (6), (7), and (8):

$$-0.4 < f3/r3\text{-}2 < 0.4; \quad (6)$$

$$-1.25 < r4\text{-}1/r4\text{-}3 < -0.8; \quad (7)$$

and $$0.3 < r4\text{-}2/f4 < 0.6, \quad (8)$$

where:
f3 is a focal length of the third lens group;
f4 is a focal length of the fourth lens group;
r3-2 is a radius of curvature of the image side surface of the convex lens of the third lens group;
r4-1 is a radius of curvature of the object side surface of the concave meniscus lens of the fourth lens group;
r4-2 is a radius of curvature of a cemented surface of the fourth lens group; and
r4-3 is a radius of curvature of a surface on the image side of the convex lens of the fourth lens group.

4. The zoom lens as claimed in claim 2,
characterized in that:
the third lens group is composed of a single convex lens, and at least one surface is an aspheric surface; and
the fourth lens group is composed of a cemented lens made up of a concave meniscus lens with a concavity facing to the image side, and a double convex lens whose surface on the image side is an aspheric surface, which are disposed in order from the object side, and characterized by satisfying each of the following conditional expressions (6), (7), and (8):

$$-0.4 < f3/r3\text{-}2 < 0.4; \quad (6)$$

$$-1.25 < r4\text{-}1/r4\text{-}3 < -0.8; \quad (7)$$

and $$0.3 < r4\text{-}2/f4 < 0.6, \quad (8)$$

where:
f3 is a focal length of the third lens group;
f4 is a focal length of the fourth lens group;
r3-2 is a radius of curvature of the image side surface of the convex lens of the third lens group;
r4-1 is a radius of curvature of the object side surface of the concave meniscus lens of the fourth lens group;
r4-2 is a radius of curvature of a cemented surface of the fourth lens group; and
r4-3 is a radius of curvature of a surface on the image side of the convex lens of the fourth lens group.

5. The zoom lens as claimed in claim 1,
characterized in that:
the third lens group is composed of a convex lens, and a cemented lens made up of a convex lens with a strong convexity facing to the object side and a concave lens with a strong concavity facing to an image side, which are disposed in order from the object side, and at least one surface is an aspheric surface; and
the fourth lens group is composed of a single convex lens, and at least one surface is an aspheric surface, and characterized by satisfying each of the following conditional expressions (9) and (10):

$$0.4 < h3\text{-}5/h3\text{-}1 < 0.7; \quad (9)$$

and $$0.75 < f3/f3\text{-}1 < 1, \quad (10)$$

where:
h3-i is a paraxial ray height in the i-th surface from the object side of the third lens group, when allowing a paraxial ray parallel to an optical axis to enter the first lens group at a wide angle end;
f3 is a focal length of the third lens group; and
f3-1 is a focal length of the single convex lens of the third lens group.

6. The zoom lens as claimed in claim 2,
characterized in that:
the third lens group is composed of a convex lens, and a cemented lens made up of a convex lens with a strong convexity facing to an object side and a concave lens with a strong concavity facing to an image side, which are disposed in order from the object side, and at least one surface is an aspheric surface; and
the fourth lens group is composed of a single convex lens, and at least one surface is an aspheric surface, and characterized by satisfying each of the following conditional expressions (9) and (10):

$$0.4 < h3\text{-}5/h3\text{-}1 < 0.7; \quad (9)$$

and $$0.75 < f3/f3\text{-}1 < 1, \quad (10)$$

where:
h3-i is a paraxial ray height in the i-th surface from the object side of the third lens group, when allowing a paraxial ray parallel to an optical axis to enter the first lens group at a wide angle end;
f3 is a focal length of the third lens group; and
f3-1 is a focal length of the single convex lens of the third lens group.

7. The zoom lens as claimed in claim 1,
characterized in that:
the third lens group is composed of a single convex lens, and at least one surface is an aspheric surface; and
the fourth lens group is composed of a cemented lens made up of a convex lens with a convexity facing to the object side, a concave lens, and a convex lens, which are disposed in order from the object side, and at least a surface closest to the object side is an aspheric surface, and characterized by satisfying each of the following conditional expressions (11) and (12):

$$n4\text{-}2 > 1.8; \quad (11)$$

and $$0.1 < f3/f4 < 0.7, \quad (12)$$

where:
n4-2 is a refractive index on a d-line of the concave lens of the fourth lens group;
f3 is a focal length of the third lens group; and
f4 is a focal length of the fourth lens group.

8. The zoom lens as claimed in claim 2, characterized in that:
  the third lens group is composed of a single convex lens, and at least one surface is an aspheric surface; and
  the fourth lens group is composed of a cemented lens made up of a convex lens with a convexity facing to the object side, a concave lens, and a convex lens, which are disposed in order from the object side, and at least a surface closest to the object side is an aspheric surface, and characterized by satisfying each of the following conditional expressions (11) and (12):

$$n4\text{-}2 > 1.8; \tag{11}$$

and $$0.1 < f3/f4 < 0.7, \tag{12}$$

where:
  n4-2 is a refractive index on a d-line of the concave lens of the fourth lens group;
  f3 is a focal length of the third lens group; and
  f4 is a focal length of the fourth lens group.

9. The zoom lens as claimed in claim 1, characterized in that:
  the third lens group is composed of a convex lens and a cemented lens made up of a convex lens with a strong convexity facing to the object side and a concave lens with a strong concavity facing to the image side, which are disposed in order from the object side, and at least one surface is an aspheric surface; and
  the fourth lens group is composed of a cemented lens made up of a double convex lens and a concave lens with a convexity facing to the image side, and at least one surface is an aspheric surface, and characterized by satisfying each of the following conditional expressions (9), (11), and (13):

$$0.4 < h3\text{-}5/h3\text{-}1 < 0.7; \tag{9}$$

$$n4\text{-}2 > 1.8; \tag{11}$$

and $$0.75 < f3/f3\text{-}1 < 1.3, \tag{13}$$

where:
  h3-i is a paraxial ray height in the i-th surface from the object side of the third lens group, when allowing a paraxial ray parallel to an optical axis to enter the first lens group at a wide angle end;
  f3 is a focal length of the third lens group;
  f3-1 is a focal length of the single convex lens of the third lens group; and
  n4-2 is a refractive index on a d-line of the concave lens of the fourth lens group.

10. The zoom lens as claimed in claim 2, characterized in that:
  the third lens group is composed of a convex lens and a cemented lens made up of a convex lens with a strong convexity facing to the object side and a concave lens with a strong concavity facing to the image side, which are disposed in order from the object side, and at least one surface is an aspheric surface; and
  the fourth lens group is composed of a cemented lens made up of a double convex lens and a concave lens with a convexity facing to the image side, and at least one surface is an aspheric surface, and characterized by satisfying each of the following conditional expressions (9), (11), and (13):

$$0.4 < h3\text{-}5/h3\text{-}1 < 0.7; \tag{9}$$

$$n4\text{-}2 > 1.8; \tag{11}$$

and $$0.75 < f3/f3\text{-}1 < 1.3 \tag{13}$$

where:
  h3-i is a paraxial ray height in the i-th surface from the object side of the third lens group, when allowing a paraxial ray parallel to an optical axis to enter the first lens group at a wide angle end;
  f3 is a focal length of the third lens group;
  f3-1 is a focal length of the single convex lens of the third lens group; and
  n4-2 is a refractive index on a d-line of the concave lens of the fourth lens group.

11. An image pickup apparatus including: a zoom lens; image pickup means for converting an image captured by the zoom lens into an electric image signal; and image control means, characterized in that:
  said image control means is configured so as to form a new image signal subjected to coordinate conversion by shifting a point on an image defined by an image signal formed by said image pickup means, while referring to a conversion coordinate factor previously provided in response to a variable power rate through said zoom lens, and output the new image signal;
  said zoom lens is composed of a first lens group having positive refracting power, a second lens group having negative refracting power, a third lens group having positive refracting power, and a fourth lens group having positive refracting power, which are disposed in order from the object side, in which the first lens group and the third lens group are stationary, and the zoom lens performs mainly variable power by shifting the second lens group in an optical axis direction, and performs correction for image position fluctuations and focusing by shifting the fourth lens group in the optical axis direction; and
  said first lens group is composed of five lenses: a concave lens; a convex lens with a strong convexity facing to an image side; a cemented lens made up of a concave lens with a strong concavity facing to the image side, and a convex lens; and a convex lens with a strong convexity facing to the object side, which are disposed in order from the object side, and is characterized by satisfying each of the following conditional expressions:

$$(1)\ 1.25 < h1\text{-}4/h1\text{-}1 < 1.55;$$

$$(2)\ 1\text{-}2/d1\text{-}3 < 0.4;$$

$$(3)\ 1.65 < n1\text{-}2;$$

and $$(4)\ 0.1 < H1'/f1 < 0.6,$$

where:
  f1 is a focal length of the first lens group;
  h1-i is a paraxial ray height in the i-th surface from the object side when allowing a paraxial ray parallel to an optical axis to enter the first lens group;
  d1-i is axial spacing from the i-th surface to the (i+1)-th surface in the first lens group;

n1-i is a refractive index on a d-line of the i-th lens in the first lens group; and H1' is spacing from a vertex of a surface closest to the image side in the first lens group to a principal point on the image side in the first lens group ("−" indicates the object side, and "+" indicates the image side).

12. The image pickup apparatus as claimed in claim 11, characterized in that:

the second lens group of said zoom lens is composed of three lenses of a concave meniscus lens with a strong concavity facing to the image side, a double concave lens, and a convex lens, which are disposed in order from the object side, and satisfies the following conditional expression (5):

$$1.8<(n2\text{-}1+n2\text{-}2)/2, \quad (5)$$

where:

n2-1 is a refractive index on a d-line of the concave meniscus lens of the second lens group; and n2-2 is a refractive index on a d-line of the double concave lens of the second lens group.

13. The image pickup apparatus as claimed in claim 11, characterized in that:

the third lens group of said zoom lens is composed of a single convex lens, and at least one surface is an aspheric surface; and the fourth lens group of said zoom lens is composed of a cemented lens made up of a concave meniscus lens with a concavity facing to the image side, and a double convex lens whose surface on the image side is an aspheric surface, which are disposed in order from the object side, and characterized by satisfying each of the following conditional expressions (6), (7), and (8):

$$-0.4<f3/r3\text{-}2<0.4; \quad (6)$$

$$-1.25<r4\text{-}1/r4\text{-}3<-0.8; \quad (7)$$

and $$0.3<r4\text{-}2/f4<0.6, \quad (8)$$

where:

f3 is a focal length of the third lens group;

f4 is a focal length of the fourth lens group;

r3-2 is a radius of curvature of the image side surface of the convex lens of the third lens group;

r4-1 is a radius of curvature of the object side surface of the concave meniscus lens of the fourth lens group;

r4-2 is a radius of curvature of a cemented surface of the fourth lens group; and r4-3 is a radius of curvature of a surface on the image side of the convex lens of the fourth lens group.

14. The image pickup apparatus as claimed in claim 12, characterized in that:

the third lens group of said zoom lens is composed of a single convex lens, and at least one surface is an aspheric surface; and the fourth lens group of said zoom lens is composed of a cemented lens made up of a concave meniscus lens with a concavity facing to the image side, and a double convex lens whose surface on the image side is an aspheric surface, which are disposed in order from the object side, and characterized by satisfying each of the following conditional expressions (6), (7), and (8):

$$-0.4<f3/r3\text{-}2<0.4; \quad (6)$$

$$-1.25<r4\text{-}1/r4\text{-}3<-0.8; \quad (7)$$

and $$0.3<r4\text{-}2/f4<0.6, \quad (8)$$

where:

f3 is a focal length of the third lens group;

f4 is a focal length of the fourth lens group;

r3-2 is a radius of curvature of the image side surface of the convex lens of the third lens group;

r4-1 is a radius of curvature of the object side surface of the concave meniscus lens of the fourth lens-group;

r4-2 is a radius of curvature of a cemented surface of the fourth lens group; and r4-3 is a radius of curvature of a surface on the image side of the convex lens of the fourth lens group.

15. The image pickup apparatus as claimed in claim 11, characterized in that:

the third lens group of said zoom lens is composed of a convex lens, and a cemented lens made up of a convex lens with a strong convexity facing to the object side, and a concave lens with a strong concavity facing to an image side, which are disposed in order from the object side, and at least one surface is an aspheric surface; and the fourth lens group of said zoom lens is composed of a single convex lens, and at least one surface is an aspheric surface, and characterized by satisfying each of the following conditional expressions (9) and (10):

$$0.4<h3\text{-}5/h3\text{-}1<0.7; \quad (9)$$

and $$0.75<f3/f3\text{-}1<1, \quad (10)$$

where:

h3-i is a paraxial ray height in the i-th surface from the object side of the third lens group, when allowing a paraxial ray parallel to an optical axis to enter the first lens group at a wide angle end;

f3 is a focal length of the third lens group; and f3-1 is a focal length of the single convex lens of the third lens group.

16. The image pickup apparatus as claimed in claim 12, characterized in that:

the third lens group of said zoom lens is composed of a convex lens, and a cemented lens made up of a convex lens with a strong convexity facing to the object side, and a concave lens with a strong concavity facing to an image side, which are disposed in order from the object side, and at least one surface is an aspheric surface; and the fourth lens group of said zoom lens is composed of a single convex lens, and at least one surface is an aspheric surface, and characterized by satisfying each of the following conditional expressions (9) and (10):

$$0.4<h3\text{-}5/h3\text{-}1<0.7; \quad (9)$$

and $$0.75<f3/f3\text{-}1<1, \quad (10)$$

wherein:
- h3-i is a paraxial ray height in the i-th surface from the object side of the third lens group, when allowing a paraxial ray parallel to an optical axis to enter the first lens group at a wide angle end;
- f3 is a focal length of the third lens group; and
- f3-1 is a focal length of the single convex lens of the third lens group.

17. The image pickup apparatus as claimed in claim 11, characterized in that:
- the third lens group of said zoom lens is composed of a single convex lens, and at least one surface is an aspheric surface; and
- the fourth lens group of said zoom lens is composed of a cemented lens made up of a convex lens with a convexity facing to an object side, a concave lens, and a convex lens, which are disposed in order from the object side, and at least a surface closest to the object side is an aspheric surface, and characterized by satisfying each of the following conditional expressions (11) and (12):

$$n4\text{-}2 > 1.8; \tag{11}$$

and $$0.1 < f3/f4 < 0.7, \tag{12}$$

where:
- n4-2 is a refractive index on a d-line of the concave lens of the fourth lens group;
- f3 is a focal length of the third lens group; and
- f4 is a focal length of the fourth lens group.

18. The image pickup apparatus as claimed in claim 12, characterized in that:
- the third lens group of said zoom lens is composed of a single convex lens, and at least one surface is an aspheric surface; and
- the fourth lens group of said zoom lens is composed of a cemented lens made up of a convex lens with a convexity facing to an object side, a concave lens, and a convex lens, which are disposed in order from the object side, and at least a surface closest to the object side is an aspheric surface, and characterized by satisfying each of the following conditional expressions (11) and (12):

$$n4\text{-}2 > 1.8; \tag{11}$$

and $$0.1 < f3/f4 < 0.7, \tag{12}$$

where:
- n4-2 is a refractive index on a d-line of the concave lens of the fourth lens group;
- f3 is a focal length of the third lens group; and
- f4 is a focal length of the fourth lens group.

19. The image pickup apparatus as claimed in claim 11, characterized in that:
- the third lens group of said zoom lens is composed of a convex lens and a cemented lens made up of a convex lens with a strong convexity facing to the object side and a concave lens with a strong concavity facing to the image side, which are disposed in order from the object side, and at least one surface is an aspheric surface; and
- the fourth lens group of said zoom lens is composed of a cemented lens made up of a double convex lens and a concave lens with a convexity facing to the image side, and at least one surface is an aspheric surface, and characterized by satisfying each of the following conditional expressions (9), (11), and (13):

$$0.4 < h3\text{-}5/h3\text{-}1 < 0.7; \tag{9}$$

$$n4\text{-}2 > 1.8; \tag{11}$$

and $$0.75 < f3/f3\text{-}1 < 1.3, \tag{13}$$

where:
- h3-i is a paraxial ray height in the i-th surface from the object side of the third lens group, when allowing a paraxial ray parallel to an optical axis to enter the first lens group at a wide angle end;
- f3 is a focal length of the third lens group;
- f3-1 is a focal length of the single convex lens of the third lens group; and
- n4-2 is a refractive index on a d-line of the concave lens of the fourth lens group.

20. The image pickup apparatus according to claim 12, characterized in that:
- the third lens group of said zoom lens is composed of a convex lens and a cemented lens made up of a convex lens with a strong convexity facing to the object side and a concave lens with a strong concavity facing to the image side, which are disposed in order from the object side, and at least one surface is an aspheric surface; and
- the fourth lens group of said zoom lens is composed of a cemented lens made up of a double convex lens and a concave lens with a convexity facing to the image side, and at least one surface is an aspheric surface, characterized by satisfying each of the following conditional expressions (9), (11), and (13):

$$0.4 < h3\text{-}5/h3\text{-}1 < 0.7; \tag{9}$$

$$n4\text{-}2 > 1.8; \tag{11}$$

and $$0.75 < f3/f3\text{-}1 < 1.3, \tag{13}$$

where:
- h3-i is a paraxial ray height in the i-th surface from the object side of the third lens group, when allowing a paraxial ray parallel to an optical axis to enter the first lens group at a wide angle end;
- f3 is a focal length of the third lens group;
- f3-1 is a focal length of the single convex lens of the third lens group; and
- n4-2 is a refractive index on a d-line of the concave lens of the fourth lens group.

* * * * *